United States Patent
Kato et al.

(10) Patent No.: US 9,539,966 B2
(45) Date of Patent: Jan. 10, 2017

(54) VEHICLE BODY FRONT SECTION STRUCTURE

(71) Applicant: TOYOTA JIDOSHA KABUSHIKI KAISHA, Toyota-shi (JP)

(72) Inventors: Hiroshi Kato, Susono (JP); Shintaro Kitakata, Nisshin (JP); Syouta Hashimoto, Susono (JP); Atsushi Mikuni, Toyota (JP); Harutoshi Motojima, Hadano (JP); Satoshi Funabashi, Nagaizumi-machi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/650,178

(22) PCT Filed: Dec. 4, 2013

(86) PCT No.: PCT/JP2013/082637
§ 371 (c)(1),
(2) Date: Jun. 5, 2015

(87) PCT Pub. No.: WO2014/088045
PCT Pub. Date: Jun. 12, 2014

(65) Prior Publication Data
US 2015/0314742 A1 Nov. 5, 2015

(30) Foreign Application Priority Data
Dec. 7, 2012 (JP) .................................. 2012-268756

(51) Int. Cl.
*B60R 19/24* (2006.01)
*B60R 19/34* (2006.01)
(Continued)

(52) U.S. Cl.
CPC ............... *B60R 19/24* (2013.01); *B60R 19/04* (2013.01); *B60R 19/34* (2013.01); *B60R 19/36* (2013.01);
(Continued)

(58) Field of Classification Search
CPC .......... B60R 19/24; B60R 19/26; B60R 19/34; B62D 21/15; B62D 21/152; B62D 25/082
(Continued)

(56) References Cited

U.S. PATENT DOCUMENTS 4,109,899 A * 8/1978 Takatsu .................. B60R 19/26
267/140
2004/0195862 A1 10/2004 Saeki
(Continued)

FOREIGN PATENT DOCUMENTS

JP          4122887      7/2008
JP       2008 213739     9/2008
(Continued)

OTHER PUBLICATIONS

J.I.I.I. Journal of Technical Disclosure No. 2011-504318 Published Nov. 1, 2011 (3 Pages).
(Continued)

*Primary Examiner* — Jason S Daniels
(74) *Attorney, Agent, or Firm* — Oblon, McClelland, Maier & Neustadt, L.L.P.

(57) ABSTRACT

A vehicle body front section structure includes a first projection member provided at an outside wall of a front side member, and projecting out further to the vehicle width direction outer side than the outside wall, a rear end portion being positioned further to a vehicle body rear side than a vehicle body front side end of a power unit installed to the vehicle width direction inner side of the front side member in plan view, a second projection member provided at a vehicle width direction end side of front bumper reinforcement and overlapping with the first projection member as
(Continued)

viewed from the front, the second projection member being provided with a gap to the outside wall of the front side member, and a coupling bracket provided at the vehicle body rear side of the first projection member, and coupling together the front side member and the first projection member.

6 Claims, 25 Drawing Sheets

(51) Int. Cl.
  *B62D 21/15*   (2006.01)
  *B62D 25/08*   (2006.01)
  *B60R 19/36*   (2006.01)
  *B60R 19/04*   (2006.01)
  *B62D 25/20*   (2006.01)

(52) U.S. Cl.
  CPC .......... *B62D 21/152* (2013.01); *B62D 25/082* (2013.01); *B62D 25/2018* (2013.01)

(58) Field of Classification Search
  USPC ..... 296/187.09, 187.1, 203.02; 293/132, 155
  See application file for complete search history.

(56) References Cited

U.S. PATENT DOCUMENTS

| | | | |
|---|---|---|---|
| 2013/0147233 A1 | 6/2013 | Miyashita | |
| 2014/0091585 A1* | 4/2014 | Ramoutar | B60R 19/24 293/133 |
| 2014/0117717 A1* | 5/2014 | Parkila | B60R 19/24 296/187.09 |
| 2014/0327254 A1 | 11/2014 | Miyashita | |

FOREIGN PATENT DOCUMENTS

| | | |
|---|---|---|
| JP | 2012 166743 | 9/2012 |
| JP | 2013 123957 | 6/2013 |
| JP | 2014 58184 | 4/2014 |
| JP | 2014 113892 | 6/2014 |
| JP | 2014 113894 | 6/2014 |

OTHER PUBLICATIONS

International Search Report Issued Jan. 21, 2014 in PCT/JP2013/082637 Filed Dec. 4, 2013.

* cited by examiner

FIG.3
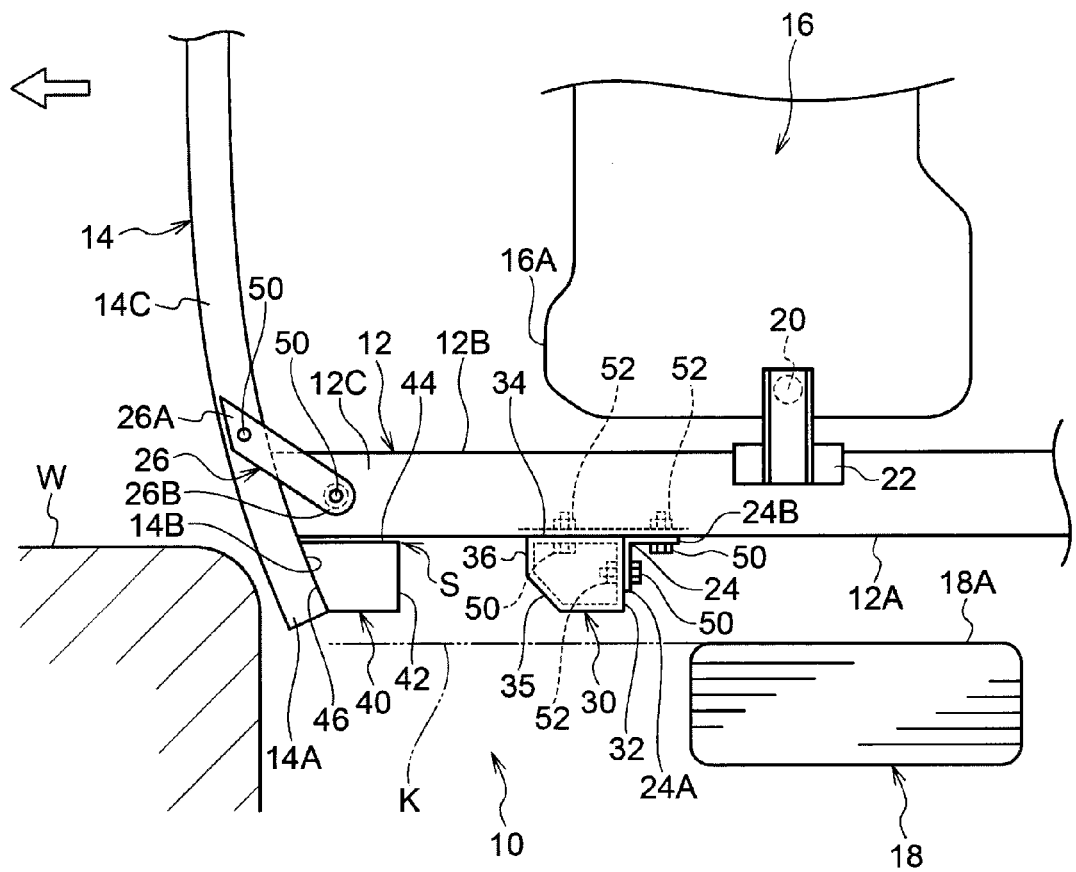
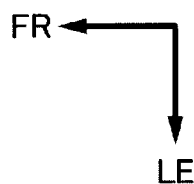

VEHICLE BODY FRONT SECTION STRUCTURE

TECHNICAL FIELD

The present invention relates to a vehicle body front section structure.

BACKGROUND ART

A vehicle body front section structure has been proposed in which a front portion of a front side member is forked in a bifurcated shape including a vehicle width direction inner side portion and a vehicle width direction outer side portion. In a face-on collision (small overlap collision) further to the vehicle width direction outer side than the front side member, collision load is transmitted to a power unit by the vehicle width direction inner side portion (see, for example, Japanese Patent No. 4122887).

SUMMARY OF INVENTION

Technical Problem

In order to suppress deformation of a vehicle in the event of a frontal collision at the vehicle width direction outer side of a front side member (a small overlap collision), efficient generation of lateral force with respect to the vehicle (force toward the opposite side to the collision side in the vehicle width direction) is desirable.

Accordingly, an object of the present invention is to obtain a vehicle body front section structure capable of efficiently generating lateral force with respect to the vehicle in the event of a small overlap collision.

Solution to Problem

In order to achieve the above object, a vehicle body front section structure of a first aspect of the present invention includes: a front side member that is disposed along a vehicle body front-rear direction at a vehicle width direction outer side of a vehicle body front section; a front bumper reinforcement that is disposed extending in a vehicle width direction at a vehicle body front side of the front side member; a first projection member that is provided at an outside wall of the front side member, and that projects out further to the vehicle width direction outer side than the outside wall of the front side member, a rear end portion of the first projection member being positioned further to a vehicle body rear side than a vehicle body front side end of a power unit installed to a vehicle width direction inner side of the front side member in plan view; a second projection member that is provided at a vehicle width direction end side of the front bumper reinforcement, and that overlaps with the first projection member as viewed from the front, the second projection member being either provided with a gap between the second projection member and the outside wall of the front side member, or provided detaching from the outside wall of the front side member when collision load has been input to the front side member; and a coupling bracket that is provided at the vehicle body rear side of the first projection member, and that couples together the front side member and the first projection member.

According to the first aspect of the present invention, the first projection member is provided at the outside wall of the front side member using the coupling bracket, so as to project out further to the vehicle width direction outer side than the outside wall of the front side member, and such that the rear end portion of the first projection member is positioned further to the vehicle body rear side than the vehicle body front side end of the power unit installed to the vehicle width direction inner side of the front side member in plan view. The second projection member is provided at the vehicle width direction end side of the front bumper reinforcement so as to overlap with the first projection member as viewed from the front along the vehicle body front-rear direction.

Accordingly, in the event of a collision with a barrier at the vehicle width direction outer side of the front side member (a small overlap collision), the second projection member impinges on the first projection member accompanying forward motion of the vehicle, thereby increasing an uncrushed amount of the front side member, and increasing a reaction force received from the barrier. Namely, a portion of the collision load input in the small overlap collision is transmitted from the second projection member and the first projection member that are connected in series, through the front side member, and into the power unit. This thereby enables efficient generation of lateral force with respect to the vehicle.

The second projection member is either provided with a gap between the second projection member and the outer side wall of the front side member, or provided such that the second projection member detaches from the outside wall when collision load has been input to the front side member. This thereby suppresses or prevents axial direction crushing of the front side member due to the collision load input in a small overlap collision from being obstructed by the second projection member.

A vehicle body front section structure of a second aspect of the present invention is the vehicle body front section structure of the first aspect, further including a coupling member that couples the front side member to the front bumper reinforcement at an angle with respect to the vehicle body front-rear direction and the vehicle width direction.

According to the second aspect of the present invention, the coupling member is provided coupling the front side member to the front bumper reinforcement at an angle with respect to the vehicle body front-rear direction and the vehicle width direction. Bending deformation of the front side member toward the vehicle width direction inner side in the event of a small overlap collision is accordingly encouraged, thereby even more efficiently generating lateral force with respect to the vehicle.

A vehicle body front section structure of a third aspect of the present invention is the vehicle body front section structure of either the first aspect or the second aspect, wherein the first projection member and the second projection member are disposed further to the vehicle width direction inner side than a front wheel in plan view.

According to the third aspect of the present invention, the first projection member and the second projection member are disposed further to the vehicle width direction inner side than the front wheel in plan view. Collision load input in the event of a small overlap collision is accordingly suppressed or prevented from being transmitted to the front wheel. The collision load input in a small overlap collision is accordingly efficiently utilized in the generation of lateral force.

A vehicle body front section structure of a fourth aspect of the present invention is the vehicle body front section structure of any one of the first aspect to the third aspect, wherein the first projection member is provided further to the vehicle body front side than an engine mount in plan view.

According to the fourth aspect of the present invention, the first projection member is provided further to the vehicle body front side than the engine mount in plan view. A portion of the collision load input in the event of a small overlap collision is therefore efficiently transmitted from the second projection member and the first projection member connected in series, through the front side member, and into the power unit. Lateral force with respect to the vehicle is accordingly efficiently generated.

Advantageous Effects of Invention

As described above, the first aspect of the present invention enables efficient generation of lateral force with respect to the vehicle in a small overlap collision.

The second aspect of the present invention enables even more efficient generation of lateral force with respect to the vehicle in a small overlap collision.

The third aspect of the present invention enables collision load input in a small overlap collision to be utilized efficiently in the generation of lateral force.

The fourth aspect of the present invention enables even more efficient generation of lateral force with respect to the vehicle in a small overlap collision.

BRIEF DESCRIPTION OF DRAWINGS

FIG. 3 is a plan view illustrating a state prior to a small overlap collision in a vehicle body front section structure according to the first exemplary embodiment.

DESCRIPTION OF EMBODIMENTS

Detailed explanation follows regarding an exemplary embodiment of the present invention, with reference to the drawings. For ease of explanation, in each of the drawings the arrow UP indicates the vehicle body upward direction, the arrow FR indicates the vehicle body front direction, and the arrow LE indicates the vehicle body left direction as appropriate. In the following explanation, unless specifically indicated, reference to up, down, front, rear, left, and right directions respectively refer to up and down in the vehicle body up-down direction, front and rear in the vehicle body front-rear direction, and left and right and the vehicle body left-right direction (vehicle width direction).

Each of the drawings illustrates the left side of a vehicle body. Since the right side of the vehicle body is similar but with left-right symmetry, explanation regarding the right side of the vehicle body is omitted as appropriate. The lengths in the vehicle body front-rear direction of the first projection member 30 and the second projection member 40 described below are set to lengths enabling the second projection member 40 to impinge on (press) the first projection member 30 when the front side member 12, described below, has undergone crushing deformation (axial direction crushing) or has undergone bending deformation toward the vehicle width direction inner side.

First Exemplary Embodiment

Figure 1:
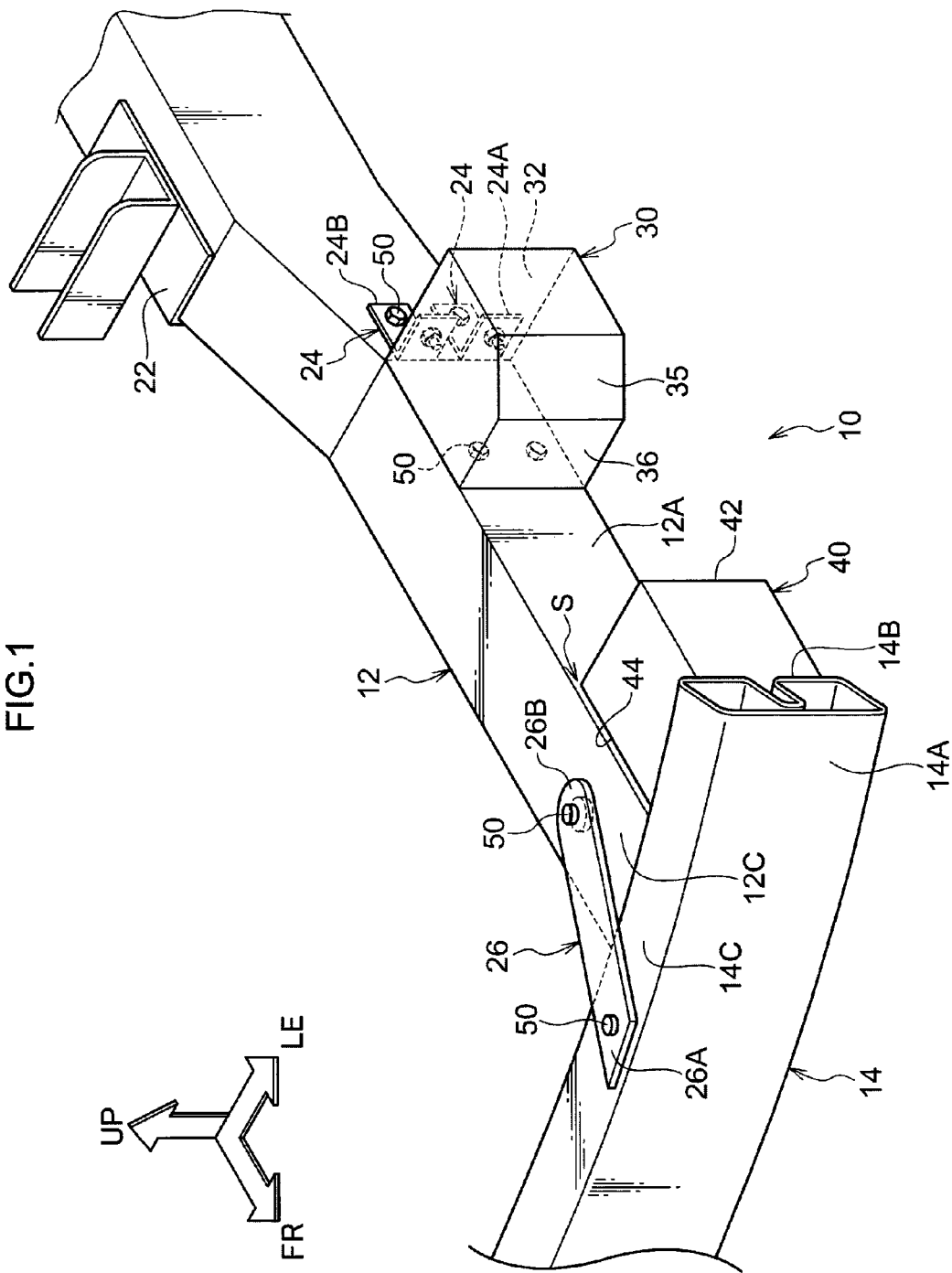
FIG. 1 is an enlarged perspective view illustrating relevant portions of a vehicle body front section structure according to a first exemplary embodiment.
Figure 2:
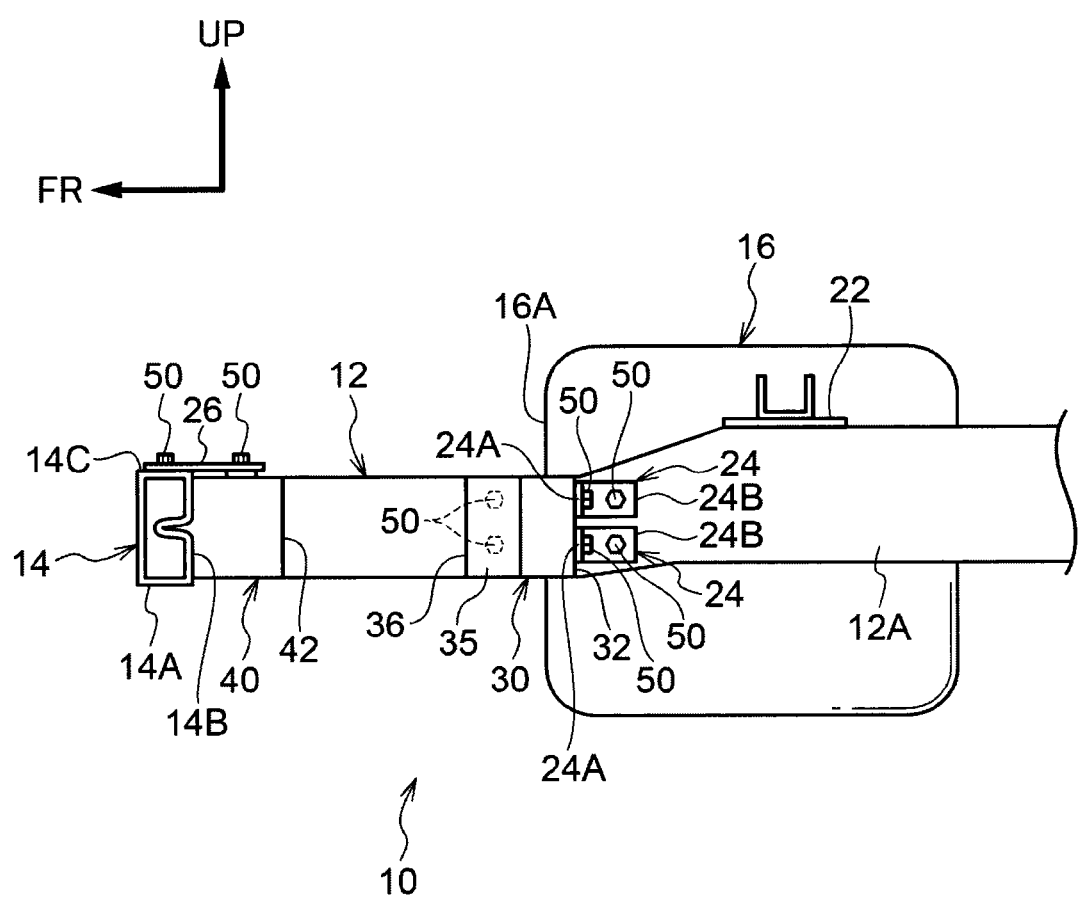
FIG. 2 is an enlarged side view illustrating relevant portions of a vehicle body front section structure according to the first exemplary embodiment.

First, explanation follows regarding a first exemplary embodiment. As illustrated in FIG. 1 to FIG. 3, a pair of left and right front side members 12, each configured with a rectangular shaped closed cross-section profile and extending in the vehicle body front-rear direction, are disposed at vehicle width direction outer sides of a vehicle body front section. Front bumper reinforcement 14 configured with a substantially rectangular shaped closed cross-section profile and extending in the vehicle width direction is provided, through brackets (not illustrated in the drawings), to vehicle body front side ends of the respective front side members 12. Both vehicle width direction ends 14A of the front bumper reinforcement 14 extend to the respective vehicle width direction outer sides of the left and right front side members 12.

Crash boxes (not illustrated in the drawings), that have rectangular shaped closed cross-section profiles, may be provided coaxially to the respective front side members 12 between the respective front side members 12 and the front bumper reinforcement 14.

As illustrated in FIG. 2 and FIG. 3, a power unit 16 that is configured including an engine and a transmission, and that drives at least front wheels 18, is installed between the left and right front side members 12. The power unit 16 is supported by engine mounts 20 respectively provided at the left and right front side members 12.

Each engine mount 20 is configured including a rubber mount (not illustrated in the drawings), serving as a resilient body, between a coaxially disposed metal inner tube (not illustrated in the drawings) and outer tube (not illustrated in the drawings). The respective inner tubes are, for example, attached to the respective front side members 12 through brackets 22, and the respective outer tubes are attached to left and right ends of the power unit 16 through brackets (not illustrated in the drawings). In this state, the respective rubber mounts resiliently deform as appropriate to discourage transmission of (to absorb) vibration from the power unit 16 to the vehicle body side.

A metal first projection member 30 that projects out further to the vehicle width direction outer side than an outside wall 12A, that is a wall on the vehicle width direction outer side of each respective front side member 12, is attached to the outside wall 12A using single or plural (for example 2) coupling brackets 24. The material of the first projection member 30 is not limited to a metal, and the first projection member 30 may, for example, be configured from a resin as long as it is capable of transmitting sufficient load to generate the necessary lateral force, described later.

In plan view, the first projection member 30 is formed in a five-sided columnar shape in which a vehicle width direction outer side front end has been cut away diagonally. A portion where a front wall 36 has been diagonally cut away configures an angled face 35. Through holes (not illustrated in the drawings) for insertion of bolts 50 are formed at specific positions on a flat plane shaped rear wall (rear end portion) 32. A weld nut 52 is provided coaxially to and in communication with each through hole at an inner face of the rear wall 32.

Through holes (not illustrated in the drawings) for insertion of bolts 50 are also formed at specific positions on the outside wall 12A of the front side member 12, further to the vehicle body rear side than the rear wall 32 of the first projection member 30. A weld nut 52 is provided coaxially to and in communication with each through hole at an inner face of the outside wall 12A.

As illustrated in FIG. 3, each coupling bracket 24 is formed from metal in a flat plate shape, bent into a substantially L-shape in plan view. Each coupling bracket 24 is formed with respective through holes (not illustrated in the drawings) for insertion of the respective bolts 50, at one end portion (load bearing face) 24A that is disposed on the first projection member 30 side, and at another end portion (load transmission face) 24B that is disposed on the front side member 12 side.

The through holes formed in the one end portions 24A of the coupling brackets 24 are accordingly placed in communication with the through holes formed in the rear wall 32 of the first projection member 30, and the one end portions 24A of the coupling brackets 24 are fastened and fixed to the rear wall 32 of the first projection member 30 by inserting the respective bolts 50 through both through holes from the vehicle body rear side and to be screwed into the corresponding weld nut 52.

Similarly, the through holes formed in the other end portions 24B of the coupling brackets 24 are accordingly placed in communication with the through holes formed in the outside wall 12A of the front side member 12, and the other end portions 24B of the coupling brackets 24 are fastened and fixed to the outside wall 12A of the front side member 12 by inserting the respective bolts 50 through both through holes from the vehicle width direction outer side to be screwed into the corresponding weld nut 52.

The vehicle body front side of an inner wall 34 of the first projection member 30 that faces toward the vehicle width direction inner side is fastened and fixed to the outside wall 12A of the front side member 12. Specifically, through holes for insertion of bolts 50 are formed at specific positions on the outside wall 12A that faces the inner wall 34, and weld nuts 52 are provided coaxially to and in communication with the through holes at the inner face of the outside wall 12A.

As well as forming the through holes for insertion of the bolts 50 at the specific positions on the inner wall 34 of the first projection member 30, a circular cylinder shaped opening (not illustrated in the drawings) is provided at the angled face 35 of the front wall 36 of the first projection member 30 for screwing in the bolt 50 from the vehicle width direction outer side. This fastening and fixing suppresses or prevents the first projection member 30 from moving away from the outside wall 12A of the front side member 12 when input with collision load.

As illustrated in FIG. 3, in plan view, the rear wall (rear end portion) 32 of the first projection member 30 is disposed at the outer side of the outside wall 12A of the front side member 12, further to the vehicle body rear side than a vehicle body front side end 16A of the power unit 16, and further to the vehicle body front side than a substantially central portion of the power unit 16 (than the engine mount 20) in the vehicle body front-rear direction.

When crash boxes are provided, the front wall (front end portion) 36 of the first projection member 30 is disposed further to the vehicle body rear side than the crash boxes, at the outer side of the outside wall 12A of the front side member 12. The first projection members 30 therefore do not obstruct crushing deformation (axial direction crushing) of the crash boxes.

Block shaped second projection members 40 made from metal are provided extending toward the vehicle body rear side at the sides of both the left and right ends (vehicle width direction ends) 14A of the front bumper reinforcement 14, so as to overlap with the first projection members 30 as viewed from the front along the vehicle body front-rear direction (in a row at a specific separation in the vehicle body front-rear direction so as to include a region that overlaps in the vehicle body up-down direction and the vehicle width direction). The material of the second projection member 40 is not limited to a metal, and the second projection member 40 may, for example, be configured from a resin as long as it is capable of transmitting load.

Each second projection member 40 includes a front wall 46 formed so as to conform to the shape of a rear wall 14B of the front bumper reinforcement 14 in plan view, a flat plane shaped rear wall 42 facing the front wall 36 of the first projection member 30 across the specific separation in the vehicle body front-rear direction, and an inner wall 44 facing the outside wall 12A of the front side member 12 across a space S.

The front wall 46 of the second projection member 40 is fastened and fixed to the rear wall 14B of the front bumper reinforcement 14. Specifically, plural through holes for bolt insertion (not illustrated in the drawings) are formed to the rear wall 14B of the front bumper reinforcement 14 that faces the front wall 46, and weld nuts (not illustrated in the drawings) are provided at the inner face of the rear wall 14B coaxially to and in communication with the respective through holes.

Plural through holes for bolt insertion are formed in the front wall 46 of the second projection member 40, and plural circular cylinder shaped openings (not illustrated in the drawings) for screwing in the bolts from the vehicle body rear side are provided at the rear wall 42 of the second projection member 40. The bolts are passed through the respective openings and the respective through holes and screwed together with the weld nuts from the vehicle body rear side, thereby fastening and fixing the second projection member 40 to the side of the vehicle width direction end 14A of the front bumper reinforcement 14.

In this state, the space S is formed between the inner wall 44 of the second projection member 40 and the outside wall 12A of the front side member 12. This suppresses or prevents the second projection member 40 from obstructing crushing deformation (axial direction crushing) of the front side member 12 when collision load is input to the front side member 12.

Although not illustrated in the drawings, the second projection member 40 may be provided straddling between the rear wall 14B at the side of the vehicle width direction end 14A of the front bumper reinforcement 14 and the outside wall 12A of the front side member 12, as long as configuration is made such that the inner wall 44 of the second projection member 40 detaches from the outside wall 12A when collision load is input to the front side member 12.

Namely, it is sufficient that the second projection member 40 is provided such that obstruction of crushing deformation (axial direction crushing) when the front side member 12 is input with collision load can be suppressed or prevented. An example of a configuration in which the inner wall 44 detaches from the outside wall 12A when collision load is input to the front side member 12 is a configuration in which the second projection member 40 slides along the outside wall 12A toward the vehicle body rear side such that an anchor portion (not illustrated in the drawings) projecting from the inner wall 44 separates from an anchor hole (not illustrated in the drawings) provided at the outside wall 12A.

As illustrated in FIG. 2, the second projection member 40 is formed at the same height as the first projection member 30 (the same height as the height of the front end side of the front side member 12). As illustrated in FIG. 3, in plan view, the first projection member 30 and the second projection member 40 are disposed further toward the vehicle width direction inner side than an inner face 18A of the front wheel 18 (than a hypothetical straight line K along the vehicle body front-rear direction).

As illustrated in FIG. 1 to FIG. 3, a brace 26 serving as a coupling member spans between an upper wall 12C at the front end side of the front side member 12, and an upper wall 14C of the front bumper reinforcement 14, further to the vehicle width direction inner side of the front bumper reinforcement 14 than the vehicle width direction end 14A. The brace 26 is formed from metal in a flat plate shape, and couples the front side member 12 and the front bumper reinforcement 14 together at an angle with respect to the vehicle body front-rear direction and the vehicle width direction.

A front end 26A of the brace 26 is fastened and fixed to the upper wall 14C of the front bumper reinforcement 14 using a bolt 50 and a weld nut (not illustrated in the drawings). A rear end 26B of the brace 26 is fastened and fixed to the upper wall 12C of the front side member 12 using a bolt 50 and a weld nut (not illustrated in the drawings).

There is no limitation to fixing the first projection member 30, the second projection member 40, and the brace 26 using bolts 50 and weld nuts 52, and, for example, fixing may be performed using an adhesive, rivets, or the like. Fixing may also be performed using an adhesive in combination with bolts 50 and weld nuts 52.

Next, explanation follows regarding operation of a vehicle body front section structure 10 according to the first exemplary embodiment, configured as described above.

Figure 4:
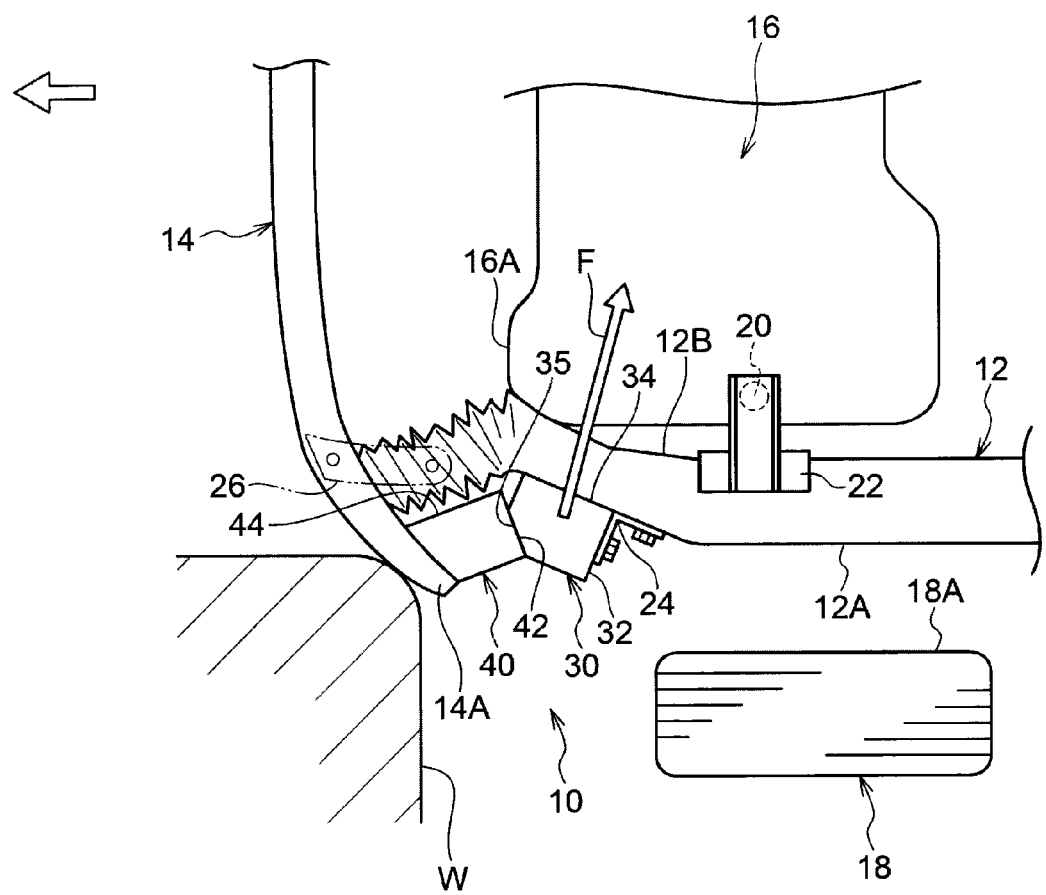
FIG. 4 is a plan view illustrating a state after a small overlap collision in which a front side member has undergone crushing deformation in a vehicle body front section structure according to the first exemplary embodiment.

As illustrated in FIG. 3 and FIG. 4, in the event of a small overlap collision in which, for example, a collision with a barrier W occurs further to the vehicle width direction outer side than the left side front side member 12 of the vehicle, namely at the left side end 14A of the front bumper reinforcement 14, the left side front side member 12 undergoes crushing deformation (axial direction crushing) accompanying forward motion of the vehicle, and the second projection member 40 impinges on (presses) the first projection member 30. Namely, the first projection member 30 prevents the second projection member 40 from moving toward the rear.

As a result, an uncrushed amount (dead stroke) of the front side member 12 is increased, and an increased reaction force is received from the barrier W. More specifically, the rear wall 42 of the second projection member 40 pushes against the angled face 35 of the first projection member 30, thereby connecting the second projection member 40 and the first projection member 30 in series. The second projection member 40 and the first projection member 30 connected in series move toward the vehicle body rear inner side. A portion of the front side member 12 that faces the inner wall 34 of the first projection member 30 is accordingly pushed and bent toward the vehicle width direction inner side.

Note that the rear wall (rear end portion) 32 of the first projection member 30 is disposed further to the vehicle body rear side than the vehicle body front side end 16A of the power unit 16. An inside wall 12B that is the vehicle width direction inside wall of the bent front side member 12 accordingly impinges on (abuts) the power unit 16, and a portion of the collision load input from the second projection member 40 to the first projection member 30 is efficiently transmitted from the first projection member 30, through the front side member 12 and the engine mount 20, and into the power unit 16 (illustrated by the arrow F in FIG. 4).

In particular, the first projection member 30 is formed in a five-sided columnar shape, with a vehicle width direction outer side end thereof configuring the angled face 35 that is angled with respect to the vehicle body front-rear direction and the vehicle width direction in plan view. This thereby enables a reaction force in a direction normal to the angled face 35, namely a component force toward the vehicle width direction inner side (the right side in the present example), to be efficiently obtained by the first projection member 30 when collision load is input to the angled face 35 from the second projection member 40.

Reaction force received from the barrier W in a small overlap collision can accordingly be easily transmitted to the collision-opposite side (the right side in the present example) by the second projection member 40 and the first projection member 30, and a lateral force with respect to the vehicle (force along the vehicle width direction towards the opposite side to the collision side) can be efficiently generated. The vehicle compartment (occupant space) can accordingly be diverted away from the barrier W in the event of a small overlap collision, such that deformation of the vehicle compartment (occupant space) can be suppressed or prevented.

Figure 5:
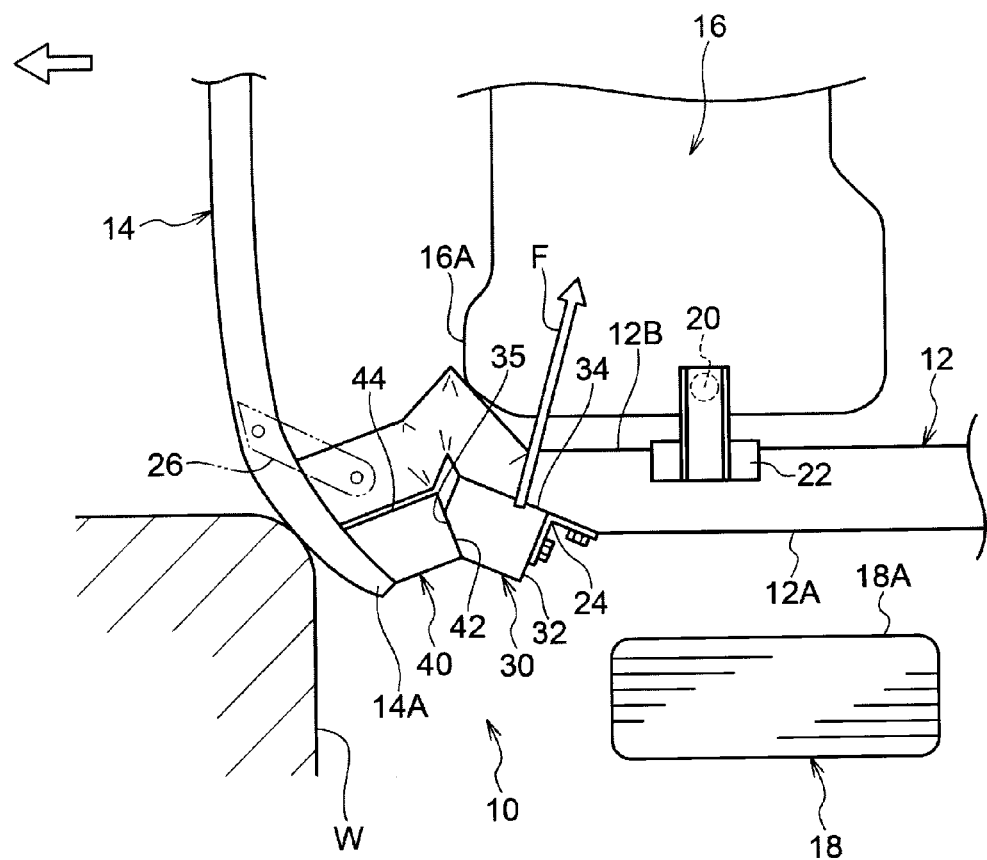
FIG. 5 is a plan view illustrating a state after a small overlap collision in which a front side member has undergone bending deformation in a vehicle body front section structure according to the first exemplary embodiment.

As illustrated in FIG. 5, similar operation also applies to cases in which the front side member 12 undergoes bending deformation toward the vehicle width direction inner side while absorbing collision load, and the inside wall 12B impinges on (abuts) the power unit 16 without the front side member 12 undergoing crushing deformation (axial direction crushing). Namely, in such cases, the rear wall 42 of the second projection member 40 pushes against the angled face 35 of the first projection member 30, such that a portion of the collision load input from the second projection member 40 to the first projection member 30 is efficiently transmitted from the first projection member 30, through the front side member 12 and the engine mount 20, and into the power unit 16 (illustrated by the arrow F in FIG. 5).

As illustrated in FIG. 3, the second projection member 40 and the first projection member 30 are both disposed further to the vehicle width direction inner side than the inner face 18A of the front wheel 18 (than the hypothetical straight line K). Collision load is accordingly suppressed or prevented from being transmitted to the front wheel 18 in the event of a small overlap collision such as that described above. This thereby enables efficient utilization of the collision load input in a small overlap collision in the generation of lateral force.

The brace 26 is provided spanning between the upper wall 14C of the front bumper reinforcement 14 and the upper wall 12C of the front side member 12, and extends at an angle with respect to the vehicle body front-rear direction and the vehicle width direction. Accordingly, in the event of a small overlap collision such as that described above, bending deformation of the front end side of the front side member 12 toward the vehicle width direction inner side accompanying forward motion of the vehicle can be encouraged, enabling even more efficient generation of lateral force with respect to the vehicle.

When crash boxes (not illustrated in the drawings) are provided, since the front wall (front end portion) 36 of the first projection member 30 is disposed further to the vehicle body rear side than the crash boxes, the first projection member 30 does not obstruct energy absorption by the crash boxes in the event of a full overlap collision or an offset collision. Namely, collision load input in a full overlap collision or an offset collision is partially absorbed by the crash boxes.

Second Exemplary Embodiment

Next, explanation follows regarding a second exemplary embodiment. Note that elements equivalent to those of the first exemplary embodiment described above are allocated the same reference numerals, and detailed explanation thereof (including of common operation) is omitted as appropriate.

Figure 6:
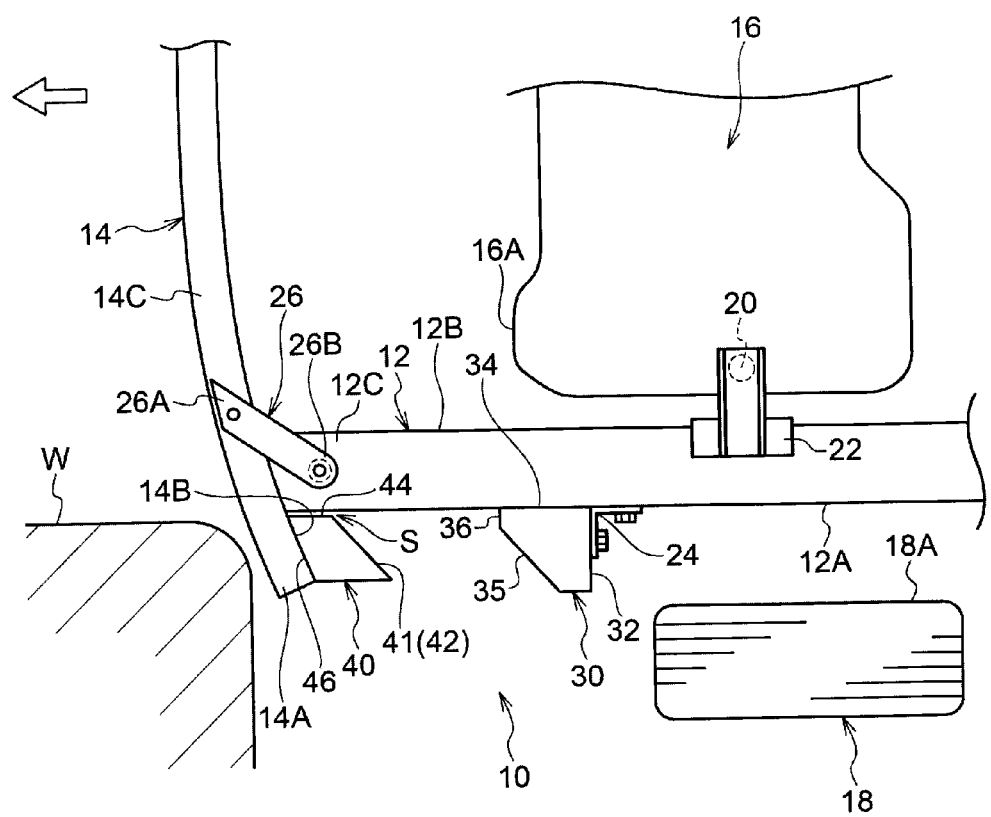
FIG. 6 is a plan view illustrating a state prior to a small overlap collision in a vehicle body front section structure according to a second exemplary embodiment.

As illustrated in FIG. 6, in the second exemplary embodiment, the vehicle width direction length and the angle of the angled face 35 are modified so as to increase the surface area of the angled face 35 of the first projection member 30. The shape of the second projection member 40 is also different to that in the first exemplary embodiment. Namely, the rear wall 42 of the second projection member 40 includes an angled face 41 angled toward the vehicle body rear outer side in plan view.

Figure 7:
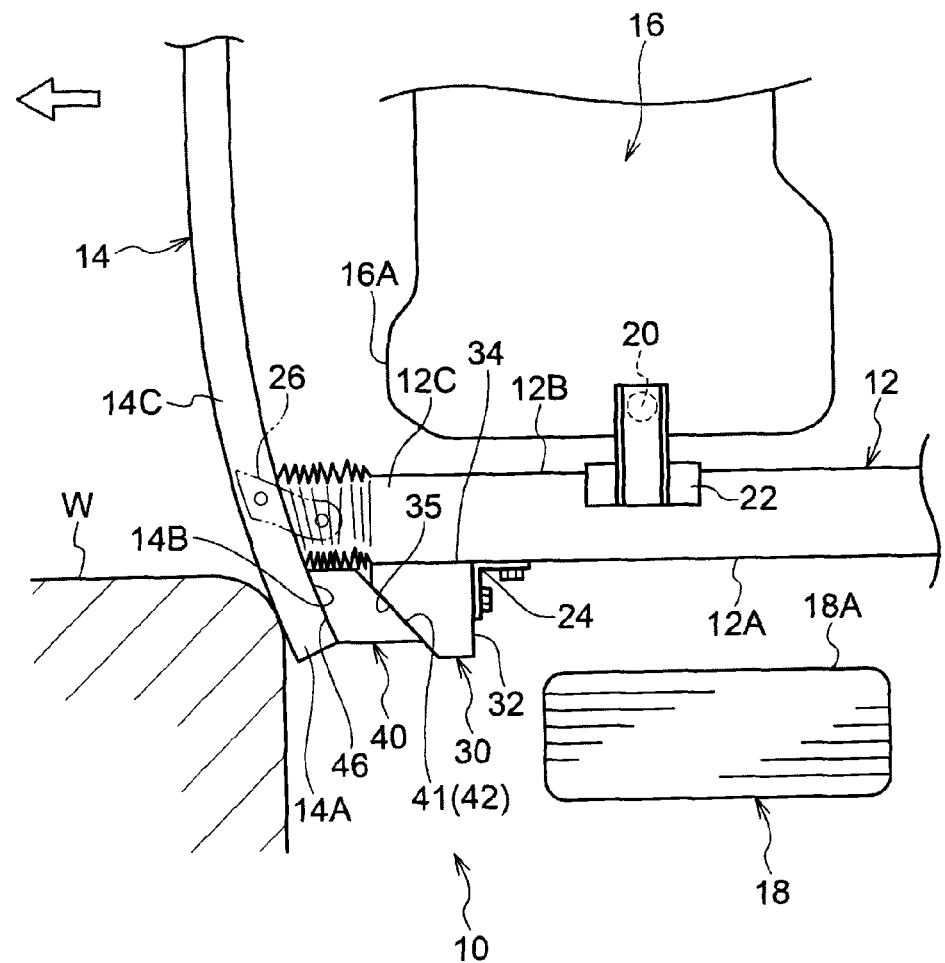
FIG. 7 is a plan view illustrating a state after a small overlap collision in which a front side member has undergone crushing deformation in a vehicle body front section structure according to the second exemplary embodiment.

As illustrated in FIG. 7, when the front side member 12 undergoes crushing deformation (axial direction crushing), the angled face 41 at the rear wall 42 of the second projection member 40 makes face-to-face contact with the angled face 35 at the front wall 36 of the first projection member 30 (connected in series). This thereby enables an increased uncrushed amount (dead stroke) of the front side member 12, and enables an increased reaction force to be received from the barrier W.

The second projection member 40 and the first projection member 30 connected in series move toward the vehicle body rear inner side accompanying further forward motion of the vehicle, and a portion of the front side member 12 that faces the inner wall 34 of the first projection member 30 is pushed and bent toward the vehicle width direction inner side. The inside wall 12B of the front side member 12 accordingly impinges on the power unit 16, thereby enabling efficient generation of lateral force with respect to the vehicle.

Third Exemplary Embodiment

Next, explanation follows regarding a third exemplary embodiment. Note that elements equivalent to those of the first exemplary embodiment described above are allocated the same reference numerals, and detailed explanation thereof (including of common operation) is omitted as appropriate.

Figure 8:
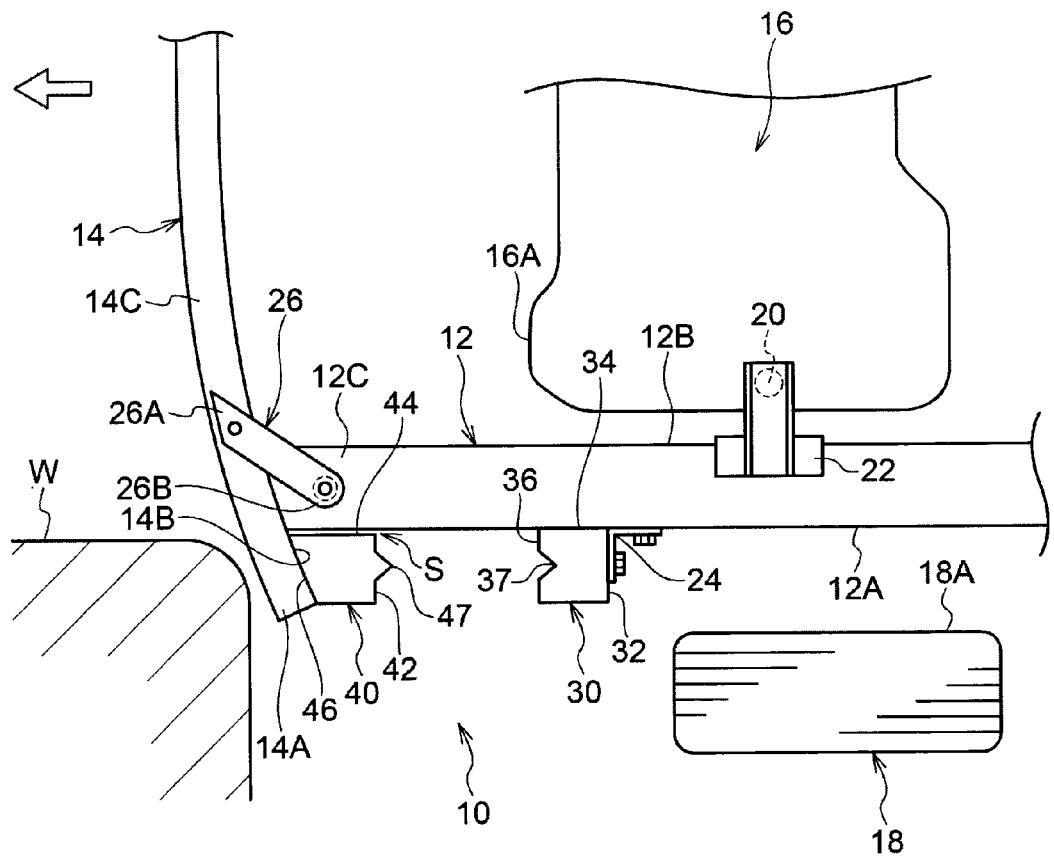
FIG. 8 is a plan view illustrating a state prior to a small overlap collision in a vehicle body front section structure according to a third exemplary embodiment.

As illustrated in FIG. 8, in the third exemplary embodiment, the shapes of the first projection member 30 and the second projection member 40 are different to those in the first exemplary embodiment. In plan view, a raised portion 47 is formed protruding out toward the vehicle body rear side in a shape forming an acute angle at a vehicle width direction central portion of the rear wall 42 of the second projection member 40. A recess 37 that is recessed toward the vehicle body rear side in a shape forming an acute angle is formed at a vehicle width direction central portion of the front wall 36 of the first projection member 30, and is capable of fitting together with the raised portion 47.

Figure 9:
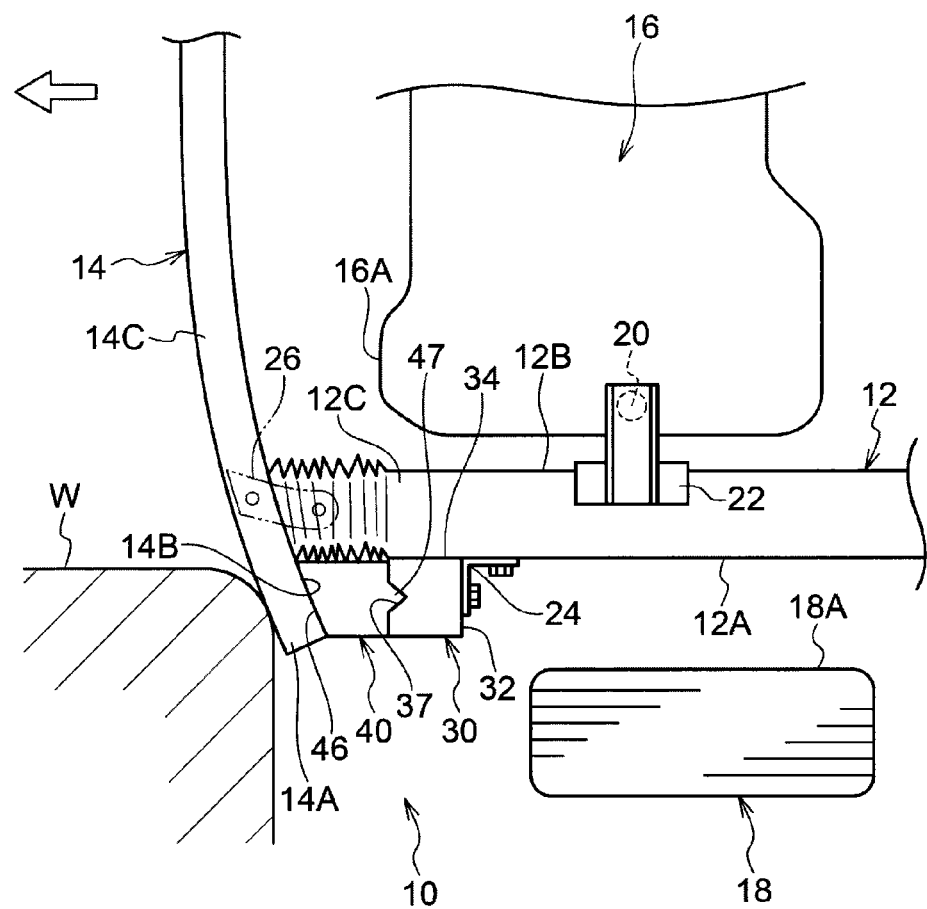
FIG. 9 is a plan view illustrating a state after a small overlap collision in which a front side member has undergone crushing deformation in a vehicle body front section structure according to the third exemplary embodiment.

As illustrated in FIG. 9, when the front side member 12 undergoes crushing deformation (axial direction crushing), the raised portion 47 at the rear wall 42 of the second projection member 40 fits into the recess 37 at the front wall 36 of the first projection member 30 such that the two form a conjoined body (a single block connected in series). This thereby enables the uncrushed amount (dead stroke) of the front side member 12 to be increased, and enables an increased reaction force to be received from the barrier W.

The second projection member 40 and the first projection member 30 connected in series move toward the vehicle body rear inner side accompanying further forward motion of the vehicle, and a portion of the front side member 12 that faces the inner wall 34 of the first projection member 30 is pushed and bent toward the vehicle width direction inner side. The inside wall 12B of the front side member 12 accordingly impinges on the power unit 16, thereby enabling efficient generation of lateral force with respect to the vehicle.

Although not illustrated in the drawings, a recess may be formed to the rear wall 42 of the second projection member 40, and a raised portion may be formed to the front wall 36 of the first projection member 30, such that the two fit together with each other. There is no limitation to a configuration in which a recess and a raised portion fit together with no play between them, and configuration may be made, for example, so as to leave play in the vehicle width direction.

Fourth Exemplary Embodiment

Next, explanation follows regarding a fourth exemplary embodiment. Note that elements equivalent to those of the first exemplary embodiment and the second exemplary embodiment described above are allocated the same reference numerals, and detailed explanation thereof (including of common operation) is omitted as appropriate.

Figure 10:
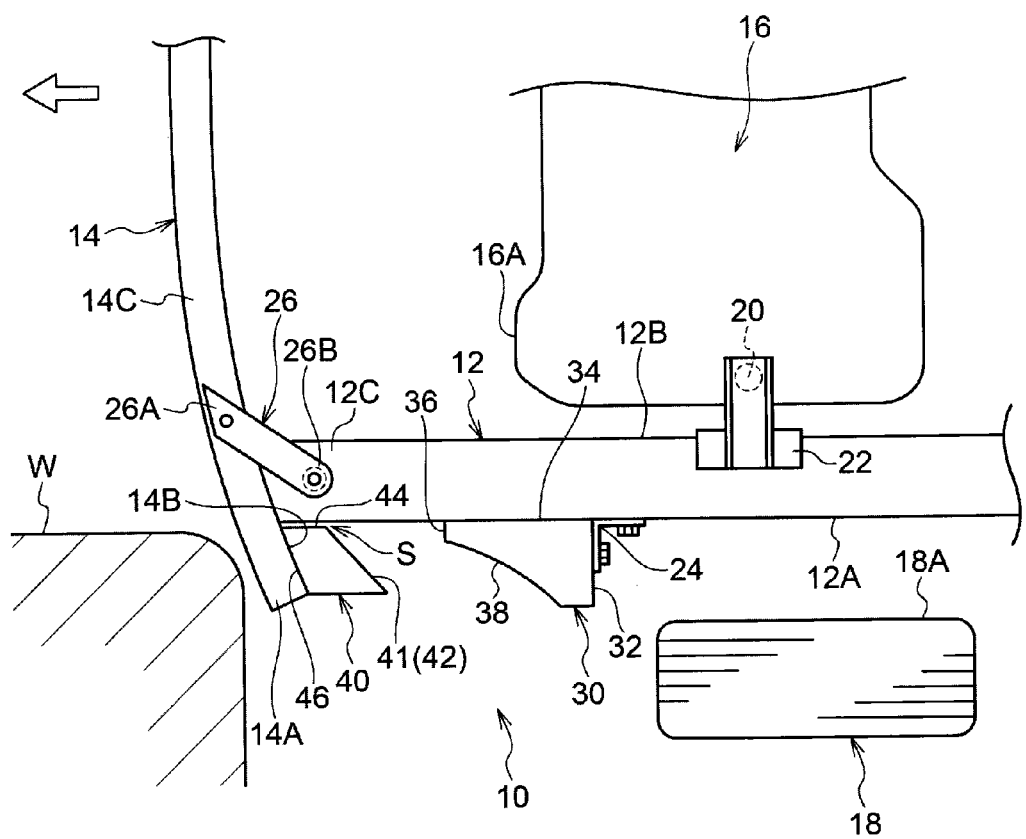
FIG. 10 is a plan view illustrating a state prior to a small overlap collision in a vehicle body front section structure according to a fourth exemplary embodiment.

As illustrated in FIG. 10, in the fourth exemplary embodiment, the shape of the first projection member 30 is different to that in the second exemplary embodiment described above. Namely, a vehicle width direction outer side portion of the front wall 36 of the first projection member 30 is formed with a curved face 38 recessed in a circular arc shape in plan view, and the vehicle width direction inner side portion of the front wall 36 has been lengthened toward the vehicle body front.

Figure 11:
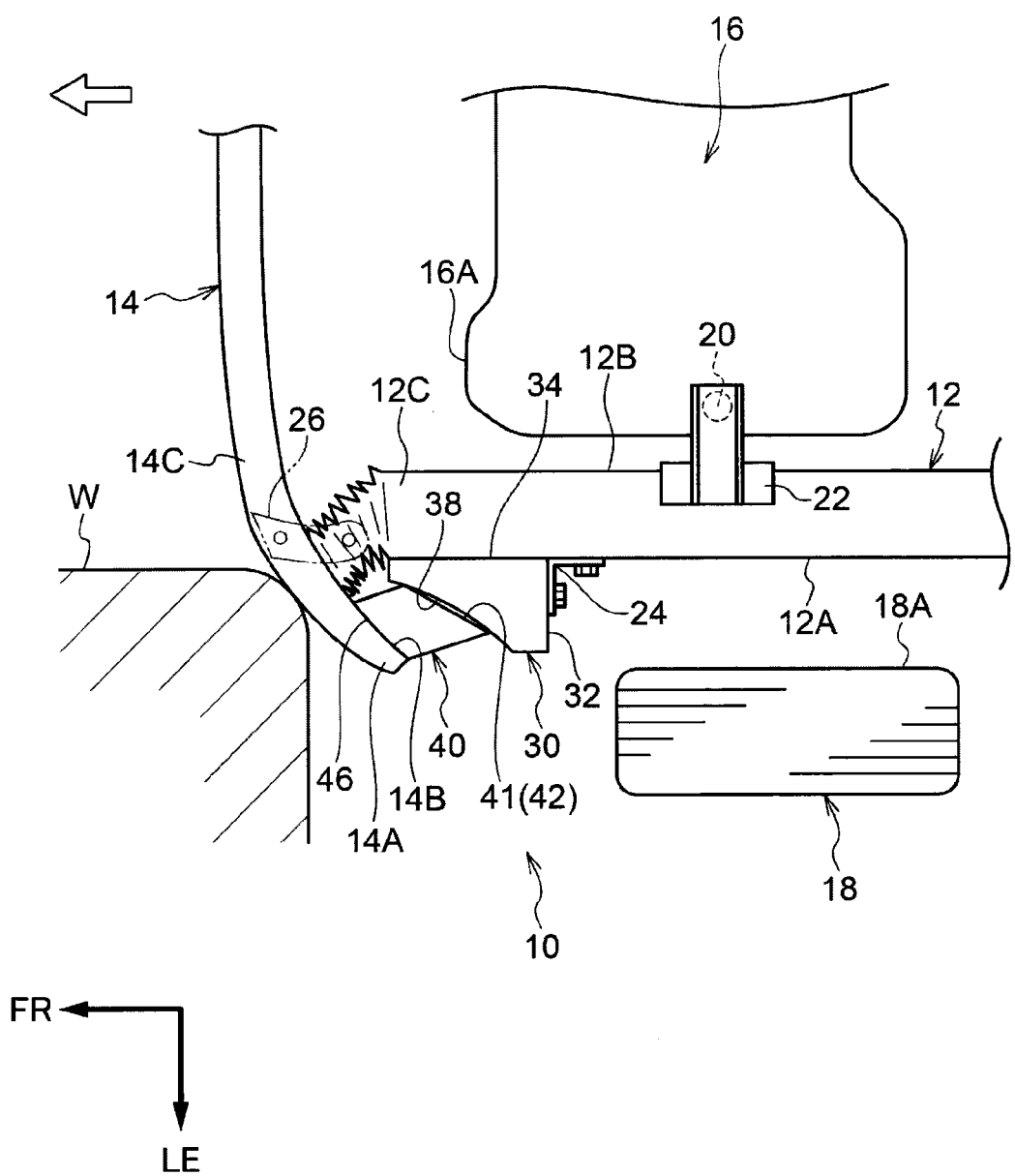
FIG. 11 is a plan view illustrating a state after a small overlap collision in which a front side member has undergone crushing deformation in a vehicle body front section structure according to the fourth exemplary embodiment.

As illustrated in FIG. 11, when the front side member 12 undergoes crushing deformation (axial direction crushing), the angled face 41 at the rear wall 42 of the second projection member 40 smoothly comes into contact with the curved face 38 of the front wall 36 of the first projection member 30 (connected in series). This thereby enables the uncrushed amount (dead stroke) of the front side member 12 to be increased, and enables an increased reaction force to be received from the barrier W.

The second projection member 40 and the first projection member 30 connected in series move toward the vehicle body rear inner side accompanying further forward motion of the vehicle, and a portion of the front side member 12 that faces the inner wall 34 of the first projection member 30 is pushed and bent toward the vehicle width direction inner side. The inside wall 12B of the front side member 12 accordingly impinges on the power unit 16, thereby enabling efficient generation of lateral force with respect to the vehicle.

Fifth Exemplary Embodiment

Next, explanation follows regarding a fifth exemplary embodiment. Note that elements equivalent to those of the first exemplary embodiment and the second exemplary embodiment described above are allocated the same reference numerals, and detailed explanation thereof (including of common operation) is omitted as appropriate.

Figure 12:
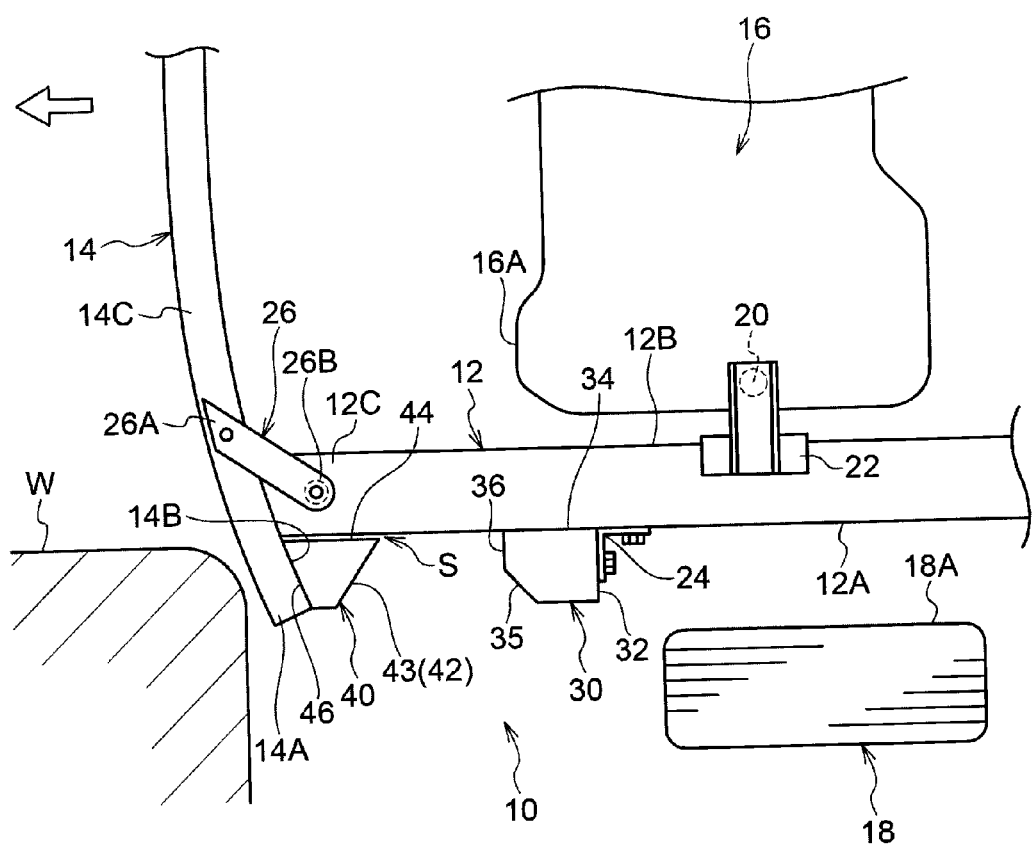
FIG. 12 is a plan view illustrating a state prior to a small overlap collision in a vehicle body front section structure according to a fifth exemplary embodiment.

As illustrated in FIG. 12, in the fifth exemplary embodiment, the first projection member 30 is equivalent to that of the first exemplary embodiment, and the shape of the second projection member 40 is different to that in the second exemplary embodiment. Namely, the rear wall 42 of the second projection member 40 includes an angled face 43 angled toward the vehicle body rear inner side in plan view. The second projection member 40 namely includes the angled face 43 angled in a direction intersecting with the angled face 41 of the rear wall 42 of the second exemplary embodiment in plan view.

Figure 13:
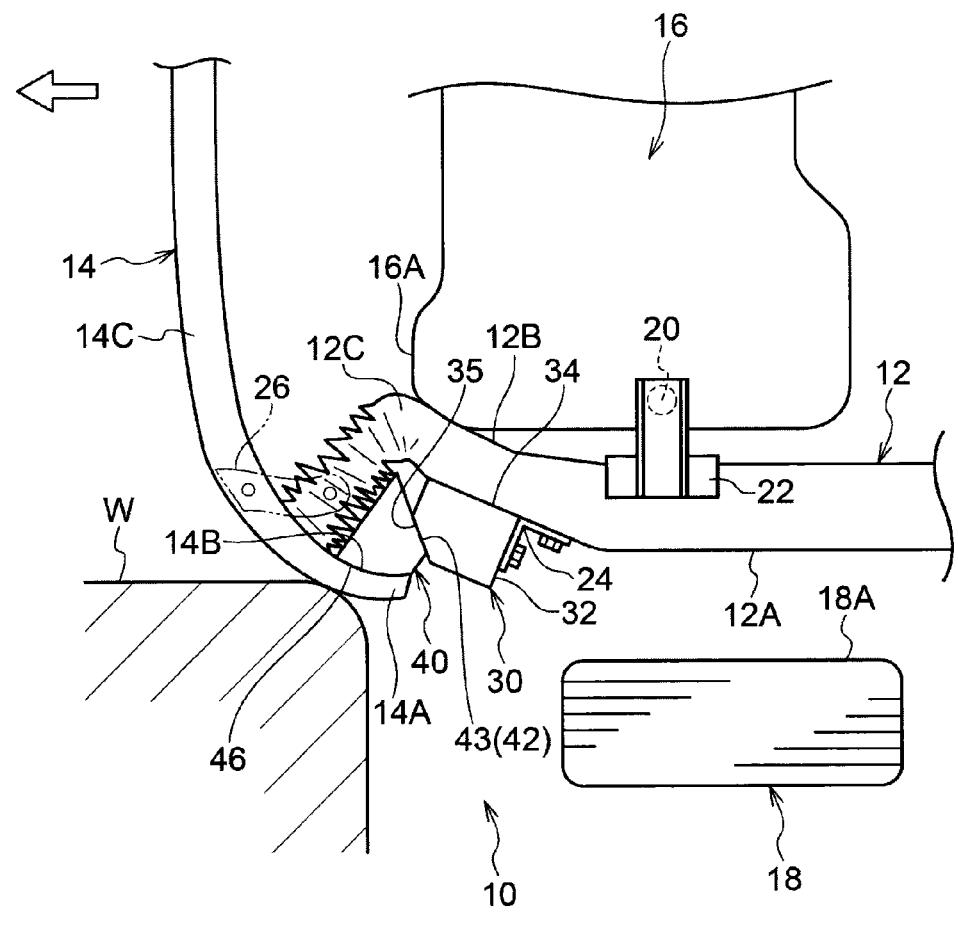
FIG. 13 is a plan view illustrating a state after a small overlap collision in which a front side member has undergone crushing deformation and undergone bending deformation in a vehicle body front section structure according to the fifth exemplary embodiment.

As illustrated in FIG. 13, when the front side member 12 undergoes crushing deformation (axial direction crushing), the angled face 43 at the rear wall 42 of the second projection member 40 makes face-to-face contact with and pushes the angled face 35 at the front wall 36 of the first projection member 30 (connected in series), and a portion of the front side member 12 bends toward the vehicle width direction inner side. The inside wall 12B of the front side member 12 accordingly impinges on the power unit 16, thereby enabling efficient generation of lateral force with respect to the vehicle.

Sixth Exemplary Embodiment

Next, explanation follows regarding a sixth exemplary embodiment. Note that elements equivalent to those of the first exemplary embodiment and the second exemplary embodiment described above are allocated the same reference numerals, and detailed explanation thereof (including of common operation) is omitted as appropriate.

Figure 14:
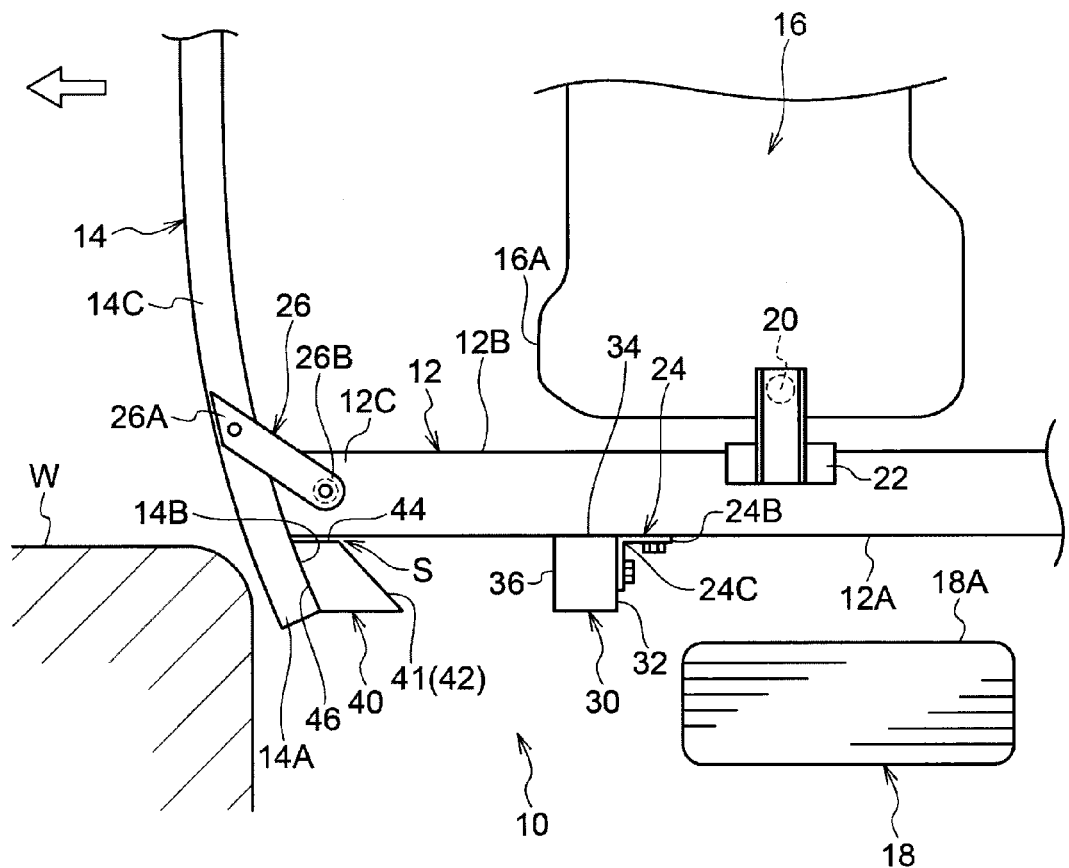
FIG. 14 is a plan view illustrating a state prior to a small overlap collision in a vehicle body front section structure according to a sixth exemplary embodiment.

As illustrated in FIG. 14, in the sixth exemplary embodiment, the shape of the first projection member 30 is different to that in the second exemplary embodiment. Namely, the front wall 36 of the first projection member 30 is configured in a flat plane shape perpendicular to the outside wall 12A in plan view, and there is no angled face 35, thereby facilitating contact with a vehicle width direction outer side end of the rear wall 42 of the second projection member 40.

Figure 15A:
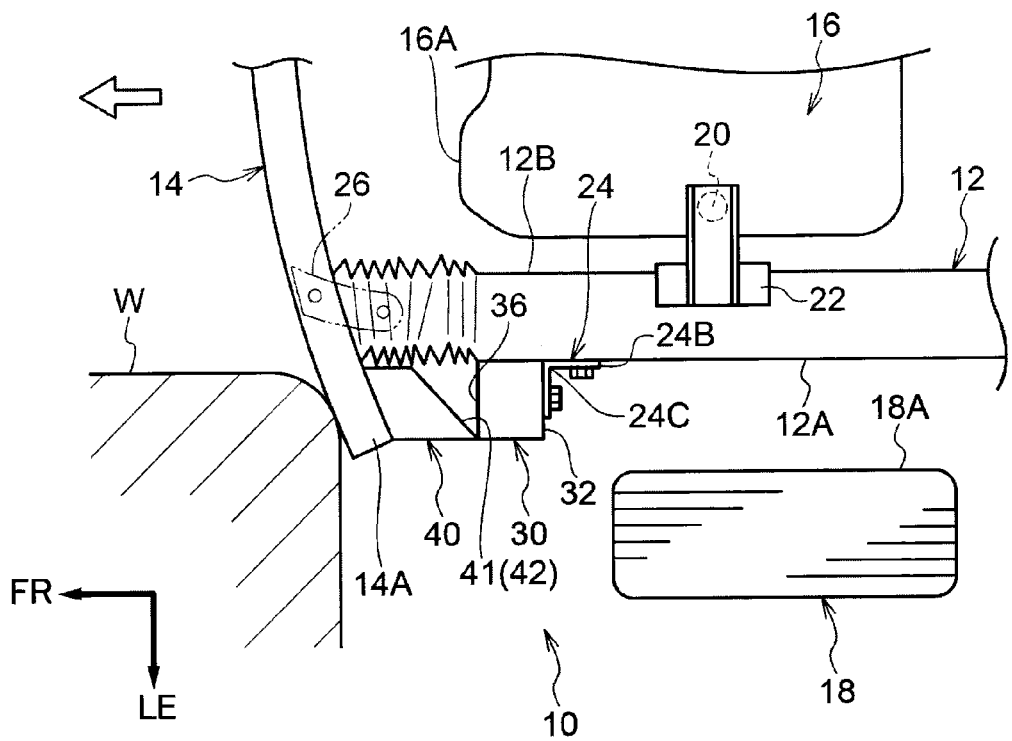
FIG. 15A is a plan view illustrating a state during a small overlap collision in which a front side member undergoes crushing deformation in a vehicle body front section structure according to the sixth exemplary embodiment.

As illustrated in FIG. 15A, when the front side member 12 undergoes crushing deformation (axial direction crushing), the vehicle width direction outer side end of the rear wall 42 of the second projection member 40 pushes a vehicle width direction outer side end of the front wall 36 of the first projection member 30, and the first projection member 30 turns toward the vehicle body rear inner side about the vicinity of a bent portion 24C of the coupling bracket 24.

Figure 15B:
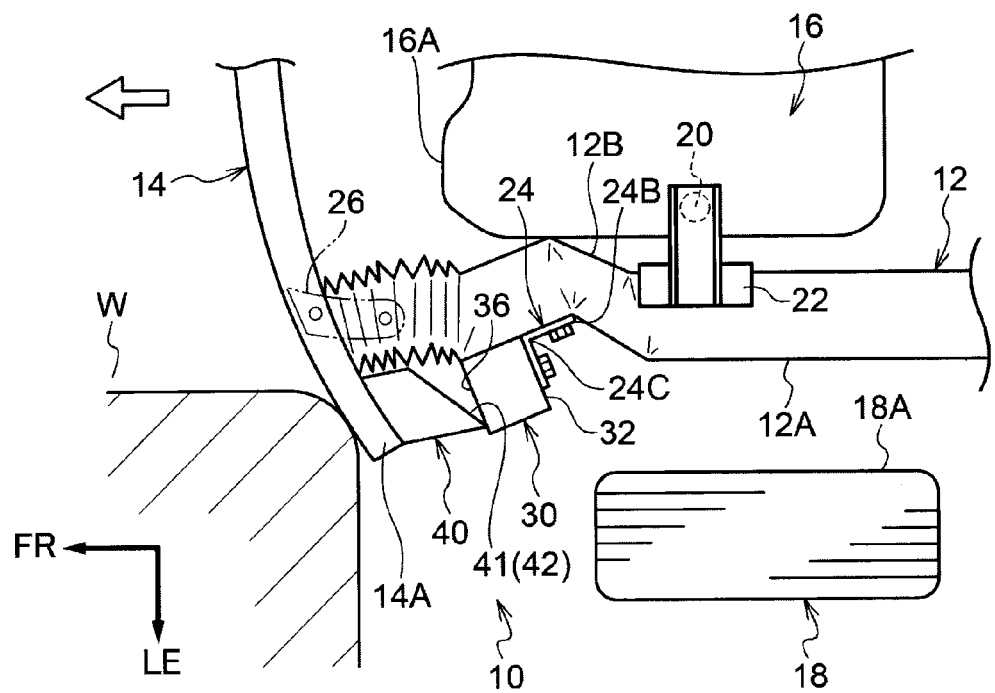
FIG. 15B is a plan view illustrating a state after a small overlap collision in which a front side member has undergone bending deformation in a vehicle body front section structure according to the sixth exemplary embodiment.

When this occurs, as illustrated in FIG. 15B, a portion of the front side member 12 is pushed toward the vehicle width direction inner side by the other end portion 24B of the coupling bracket 24, and this portion of the front side member 12 bends toward the vehicle width direction inner side. The inside wall 12B of the front side member 12 accordingly impinges on the power unit 16, thereby enabling efficient generation of lateral force with respect to the vehicle.

Seventh Exemplary Embodiment

Next, explanation follows regarding a seventh exemplary embodiment. Note that elements equivalent to those of the first exemplary embodiment and the sixth exemplary embodiment described above are allocated the same reference numerals, and detailed explanation thereof (including of common operation) is omitted as appropriate.

Figure 16:
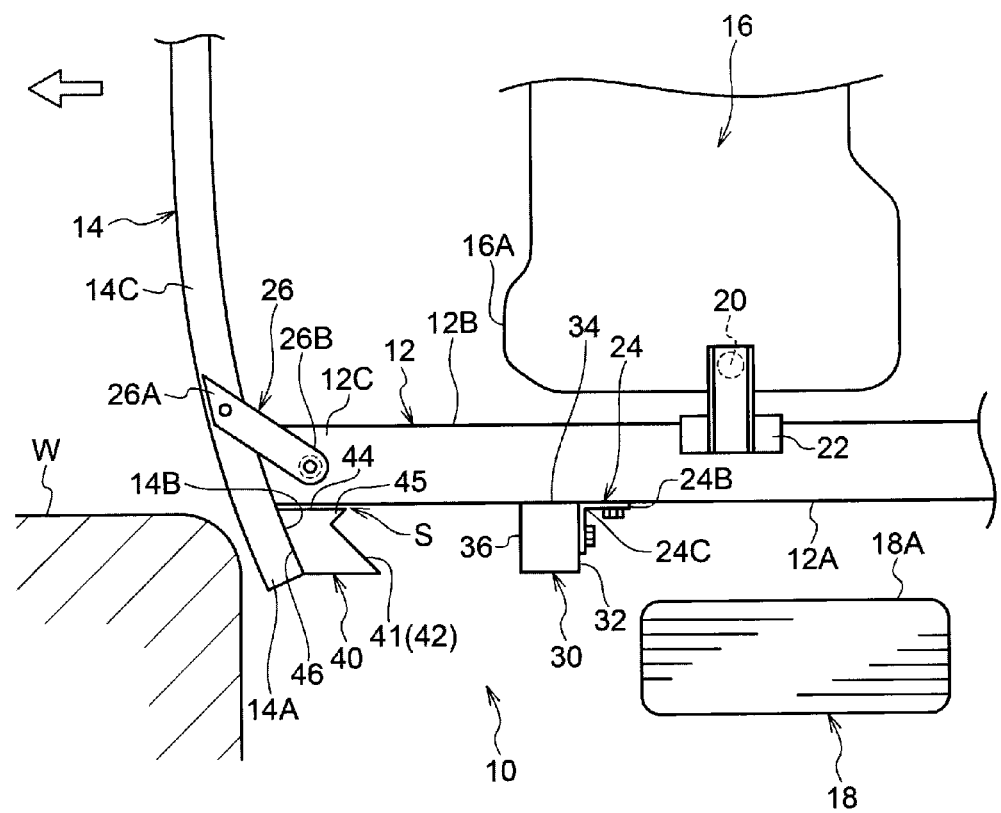
FIG. 16 is a plan view illustrating a state prior to a small overlap collision in a vehicle body front section structure according to a seventh exemplary embodiment.

As illustrated in FIG. 16, in the seventh exemplary embodiment, the shape of the second projection member 40 is different to that in the sixth exemplary embodiment. Namely, a vehicle width direction inner side end of the real wall 42 of the second projection member 40 protrudes out in a shape forming an acute angle toward the vehicle body rear in plan view (this vehicle width direction inner side end is referred to below as the "protrusion 45"), thereby increasing the surface area of the inner wall 44.

Figure 17A:
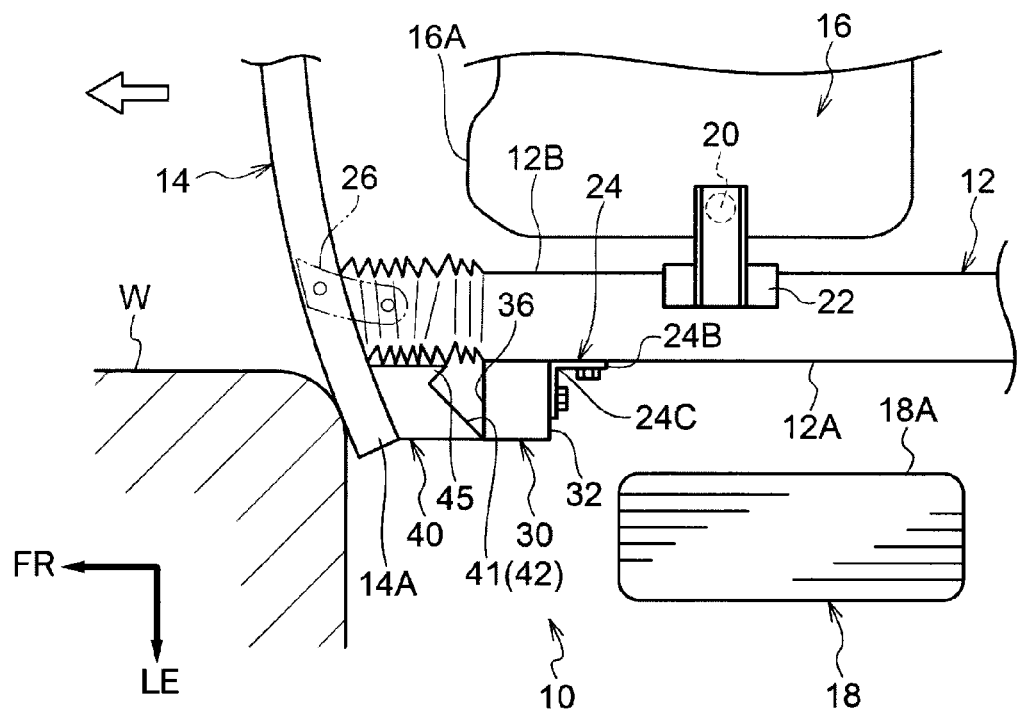
FIG. 17A is a plan view illustrating a state during a small overlap collision in which a front side member undergoes crushing deformation in a vehicle body front section structure according to the seventh exemplary embodiment.

As illustrated in FIG. 17A, crushing deformation (axial direction crushing) of the front side member 12 can accordingly be guided and promoted by the protrusion 45 (the inner wall 44 that has been lengthened toward the vehicle body rear side). Moreover, when the front side member 12 undergoes crushing deformation (axial direction crushing), the vehicle width direction outer side end of the rear wall 42 of the second projection member 40 pushes the vehicle width direction outer side end of the front wall 36 of the first projection member 30, and the first projection member 30 is turned toward the vehicle body rear inner side about the vicinity of the bent portion 24C of the coupling bracket 24.

Figure 17B:
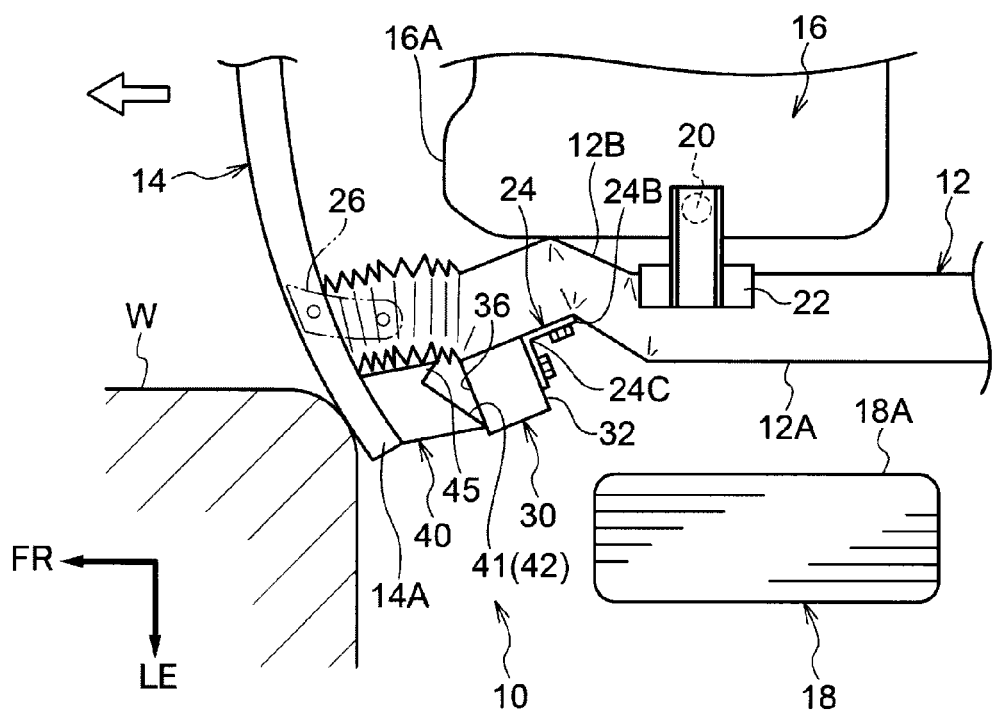
FIG. 17B is a plan view illustrating a state after a small overlap collision in which a front side member has undergone bending deformation in a vehicle body front section structure according to the seventh exemplary embodiment.

When this occurs, as illustrated in FIG. 17B, a portion of the front side member 12 is pushed toward the vehicle width direction inner side by the other end portion 24B of the coupling bracket 24, and this portion of the front side member 12 bends toward the vehicle width direction inner side. The inside wall 12B of the front side member 12 accordingly impinges on the power unit 16, thereby enabling efficient generation of lateral force with respect to the vehicle.

Eighth Exemplary Embodiment

Next, explanation follows regarding an eighth exemplary embodiment. Note that elements equivalent to those of the first exemplary embodiment and the second exemplary embodiment described above are allocated the same reference numerals, and detailed explanation thereof (including of common operation) is omitted as appropriate.

Figure 18:
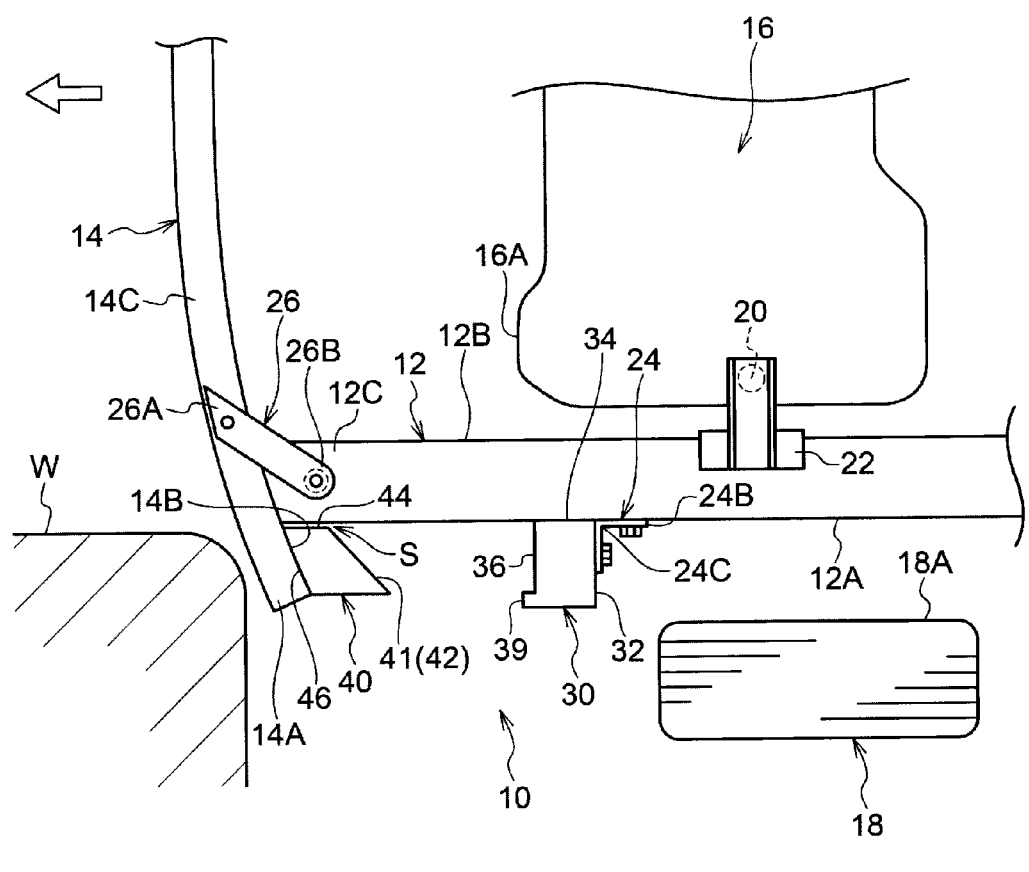
FIG. 18 is a plan view illustrating a state prior to a small overlap collision in a vehicle body front section structure according to an eighth exemplary embodiment.

As illustrated in FIG. 18, in the eighth exemplary embodiment, the shape of the first projection member 30 is different to that in the second exemplary embodiment. Namely, the front wall 36 of the first projection member 30 is configured in a flat plane shape perpendicular to the outside wall 12A in plan view, and at a vehicle width direction outer side end of the front wall 36, a ridge 39 is formed protruding out in a rectangular shape toward the vehicle body front in plan view.

Figure 19:
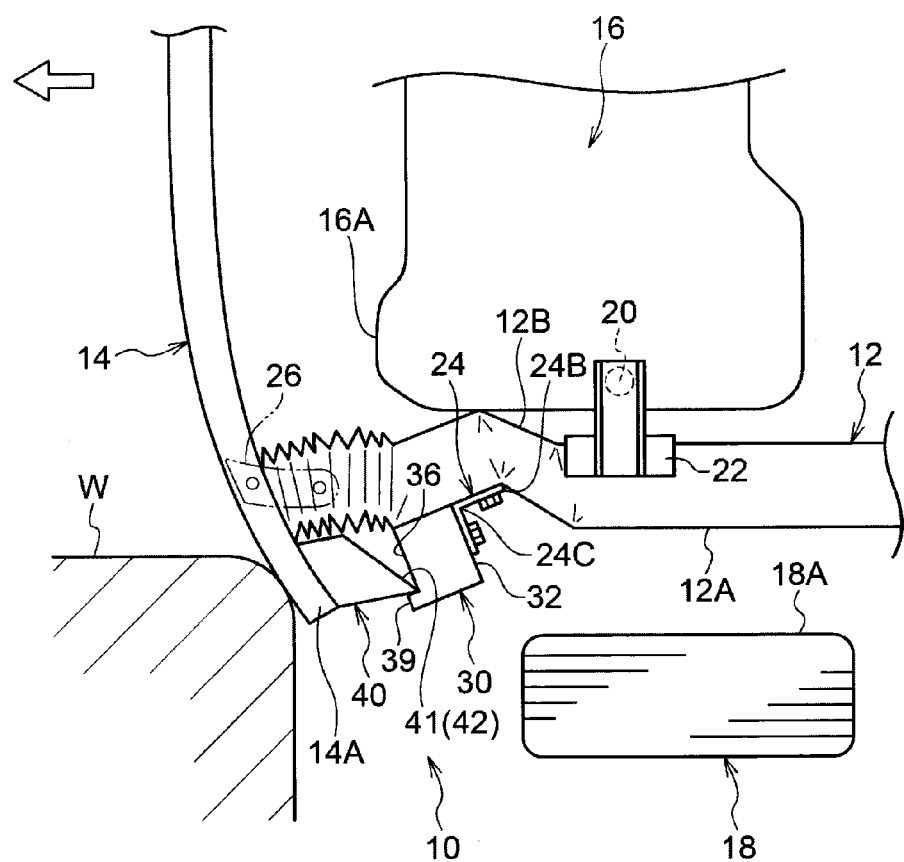
FIG. 19 is a plan view illustrating a state after a small overlap collision in which a front side member has undergone crushing deformation and undergone bending deformation in a vehicle body front section structure according to the eighth exemplary embodiment.

As illustrated in FIG. 19, when the front side member 12 undergoes crushing deformation (axial direction crushing), the vehicle width direction outer side end of the rear wall 42 (angled face 41) of the second projection member 40 catches on the vehicle width direction inner side of the ridge 39 formed to the front wall 36 of the first projection member 30. The vehicle width direction outer side end of the rear wall 42 of the second projection member 40 is accordingly suppressed or prevented from moving away from the front wall 36 of the first projection member 30 toward the vehicle width direction outer side.

This thereby enables the vehicle width direction outer side end of the rear wall 42 of the second projection member 40 to push the vehicle width direction outer side end of the front wall 36 of the first projection member 30 efficiently toward the vehicle body rear side, enabling the first projection member 30 to be turned toward the vehicle body rear inner side about the vicinity of the bent portion 24C of the coupling bracket 24.

Namely, a portion of the front side member 12 is pushed toward the vehicle width direction inner side by the other end portion 24B of the coupling bracket 24, and this portion of the front side member 12 bends toward the vehicle width direction inner side. The inside wall 12B of the front side member 12 accordingly impinges on the power unit 16, thereby enabling efficient generation of lateral force with respect to the vehicle.

Although not illustrated in the drawings, configuration may be made in which the ridge 39 is not formed at the vehicle width direction outer side of the front wall 36 of the first projection member 30, but a recess that catches a vehicle width direction outer side end of the rear wall 42 of the second projection member 40 is formed at the vehicle width direction outer side end of the front wall 36. Namely, it is sufficient that the vehicle width direction outside end of the front wall 36 of the first projection member 30 is formed with a shape capable of anchoring the vehicle width direction outer side end of the rear wall 42 of the second projection member 40 such that it does not move away toward the vehicle width direction outer side.

Ninth Exemplary Embodiment

Next, explanation follows regarding a ninth exemplary embodiment. Note that elements equivalent to those of the first exemplary embodiment and the sixth exemplary embodiment described above are allocated the same reference numerals, and detailed explanation thereof (including of common operation) is omitted as appropriate.

Figure 20:
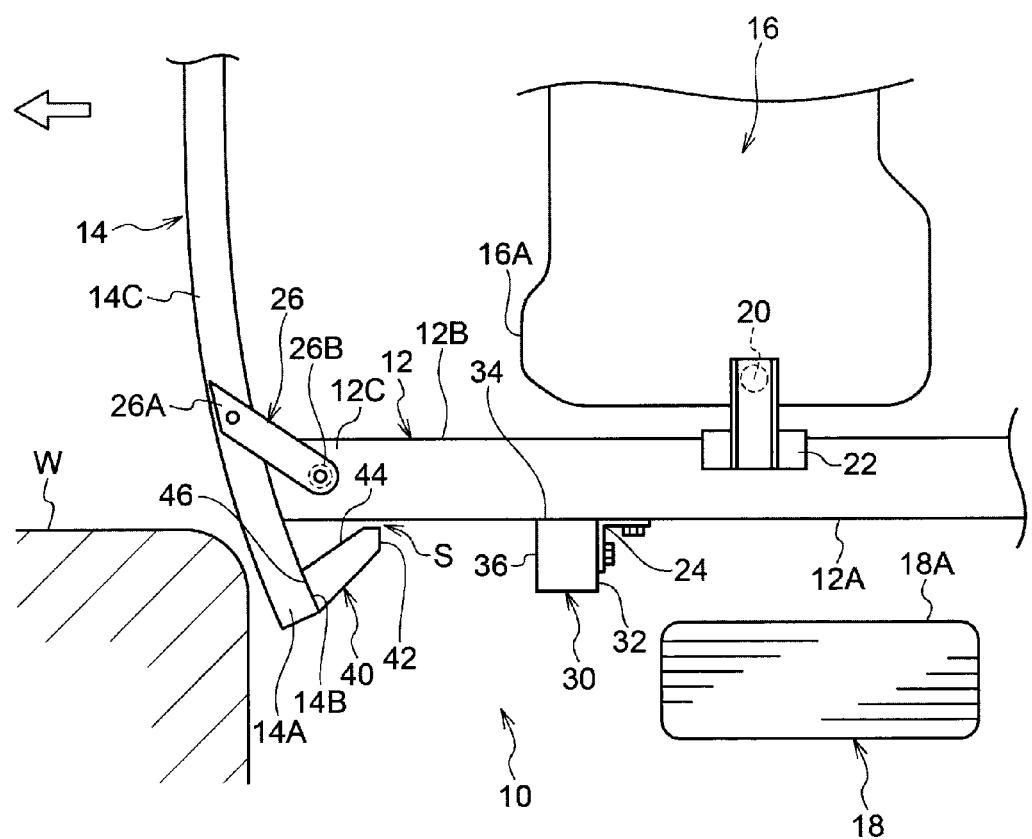
FIG. 20 is a plan view illustrating a state prior to a small overlap collision in a vehicle body front section structure according to a ninth exemplary embodiment.

As illustrated in FIG. 20, in the ninth exemplary embodiment, the shape of the second projection member 40 is different to that in the sixth exemplary embodiment. Namely, the second projection member 40 extends toward the vehicle body rear inner side (at an angle with respect to the vehicle body front-rear direction and the vehicle width direction) from the rear wall 14B on the side of the end 14A of the front bumper reinforcement 14. A vehicle width direction central portion of the rear wall 42 of the second projection member 40 is formed protruding out in an acute angle or a right angle in plan view.

The extension length of the second projection member 40 is set at a sufficient length for the first projection member 30 to impinge on (abut) the barrier W accompanying forward motion of the vehicle, even if the second projection member 40 has bent a portion of the front side member 12 toward the vehicle width direction inner side. The front side member 12 accordingly deforms in the following manner in the event that the vehicle is involved in a small overlap collision.

Figure 21A:
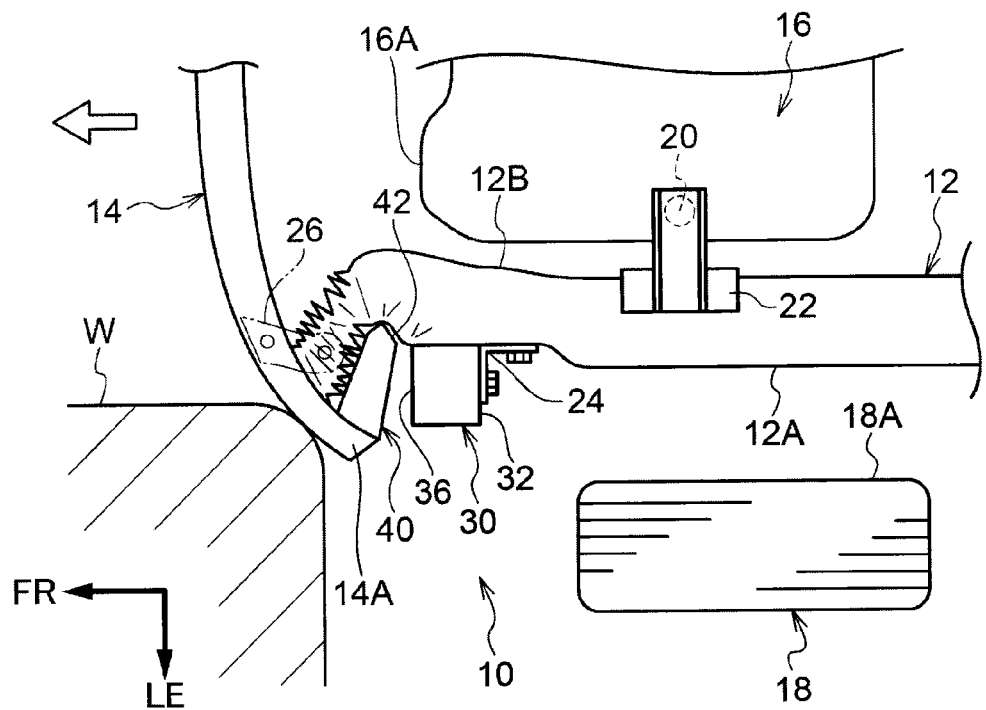
FIG. 21A is a plan view illustrating a state during a small overlap collision in which a front side member undergoes crushing deformation in a vehicle body front section structure according to the ninth exemplary embodiment.
Figure 21B:
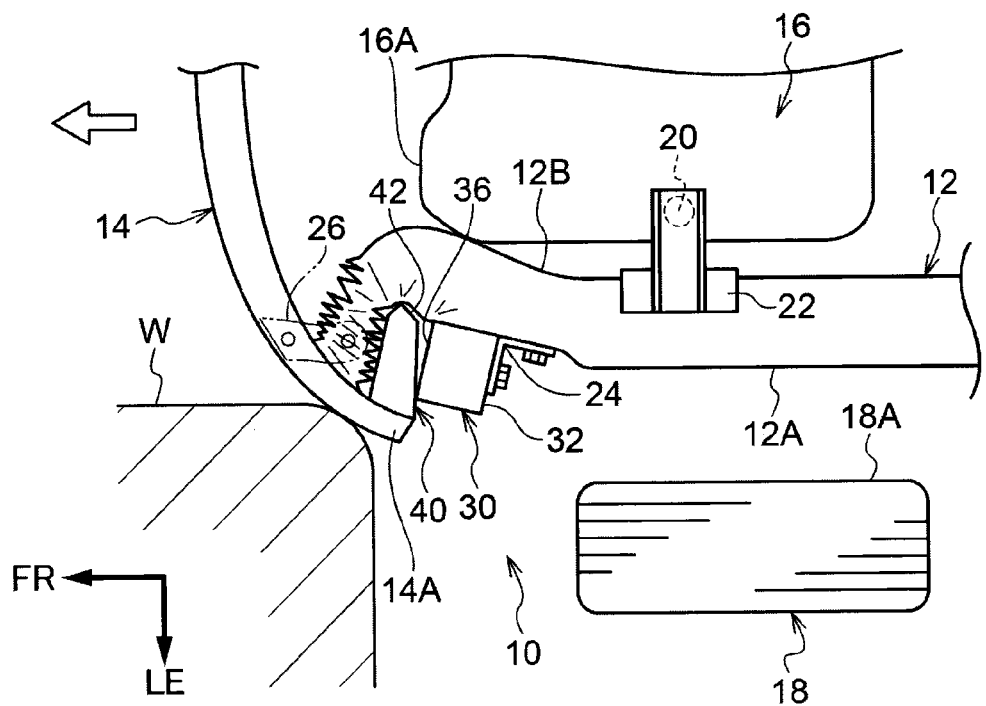
FIG. 21B is a plan view illustrating a state after a small overlap collision in which a front side member has undergone crushing deformation in a vehicle body front section structure according to the ninth exemplary embodiment.

Namely, as illustrated in FIG. 21A, the front side member 12 undergoes bending deformation toward the vehicle width direction inner side due to the second projection member 40, while the front end side of the front side member 12 undergoes crushing deformation (axial direction crushing). Moreover, as illustrated in FIG. 21B, the second projection member 40 causes the front side member 12 (inside wall 12B) that has bent toward the vehicle width direction inner side to impinge on the power unit 16, and the second projection member 40 also impinges on the first projection member 30.

Figure 22A:
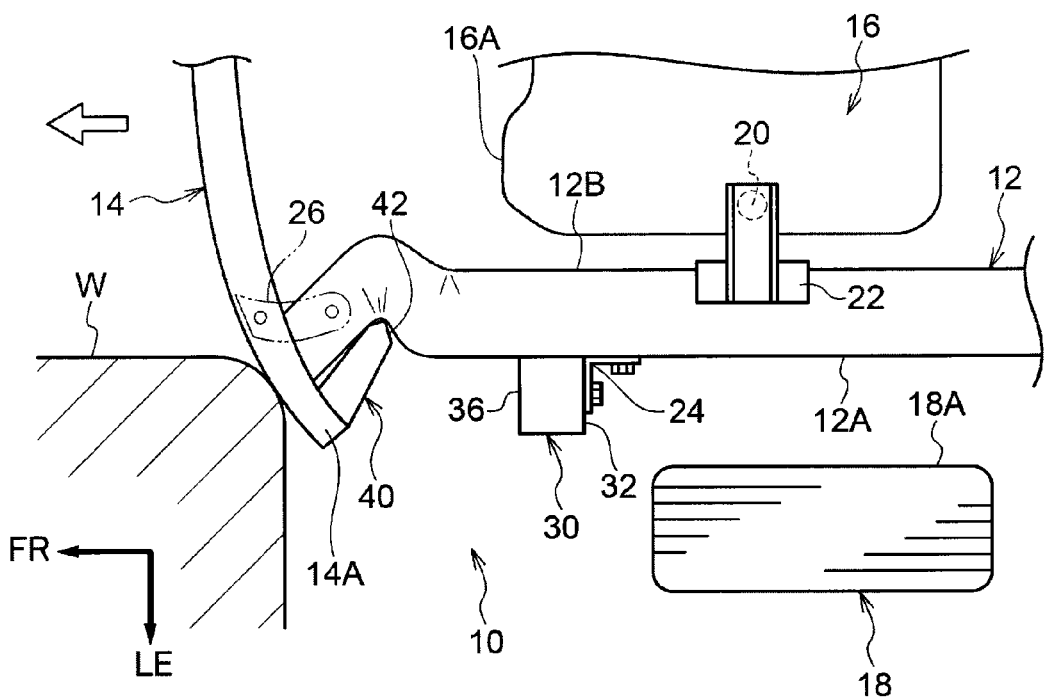
FIG. 22A is a plan view illustrating a state at an initial stage of a small overlap collision in which a front side member undergoes bending deformation in a vehicle body front section structure according to the ninth exemplary embodiment.
Figure 22B:
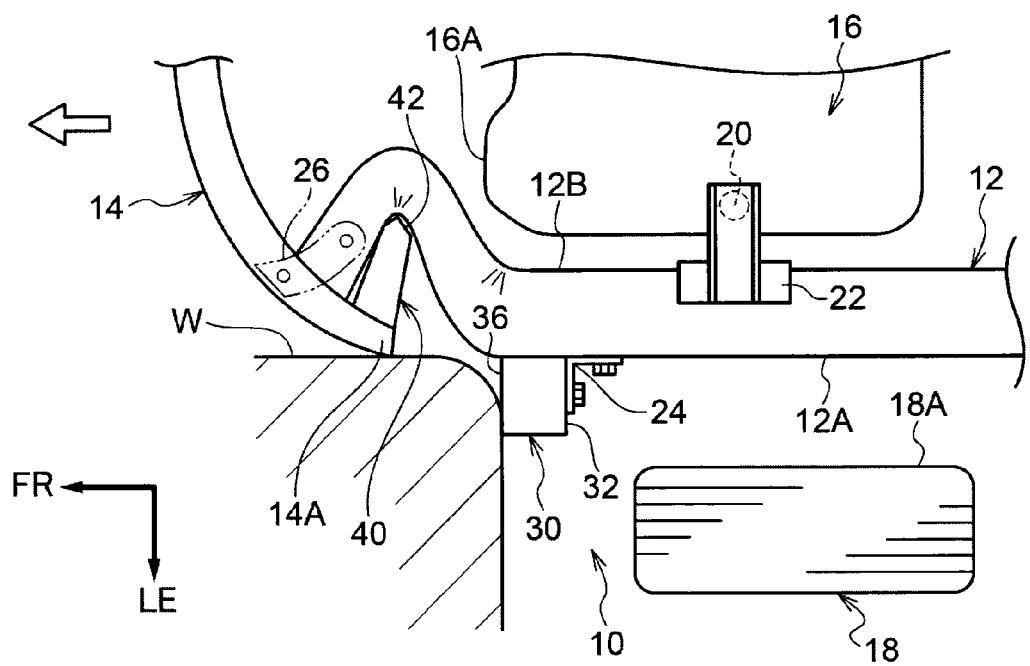
FIG. 22B is a plan view illustrating a state during a small overlap collision in which a front side member undergoes bending deformation in a vehicle body front section structure according to the ninth exemplary embodiment.

Lateral force with respect to the vehicle can accordingly be efficiently generated. Note that, as illustrated in FIG. 22A, when the front end side of the front side member 12 has been caused to undergo bending deformation toward the vehicle width direction inner side by the second projection member 40 without the front end side of the front side member 12 undergoing crushing deformation (axial direction crushing), then, as illustrated in FIG. 22B, the front wall 36 of the first projection member 30 impacts the barrier W accompanying forward motion of the vehicle.

Figure 23A:
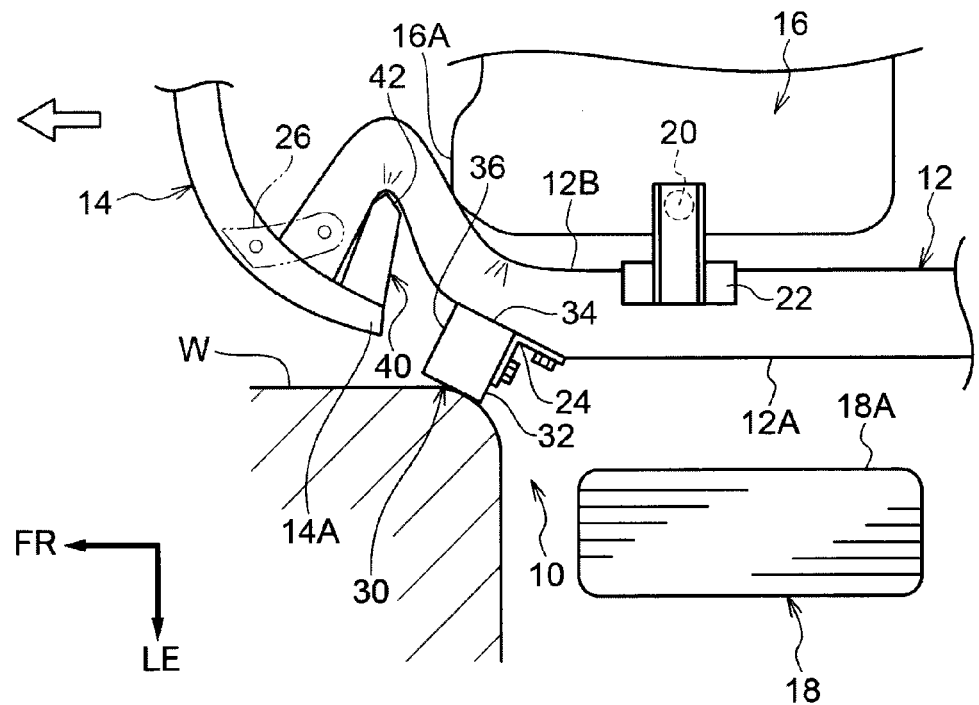
FIG. 23A is a plan view illustrating a state after a small overlap collision in which a first projection member of a vehicle body front section structure according to the ninth exemplary embodiment has overridden a barrier.

In such cases, as illustrated in FIG. 23A, the first projection member 30 overrides the barrier W accompanying forward motion of the vehicle, and a portion of the front side member 12 that faces the inner wall 34 is pushed toward the vehicle width direction inner side. The portion of the front side member 12 accordingly moves toward the vehicle width direction inner side, and the inside wall 12B of the front side member 12 impinges on the power unit 16, thereby enabling efficient generation of lateral force with respect to the vehicle.

Figure 23B:
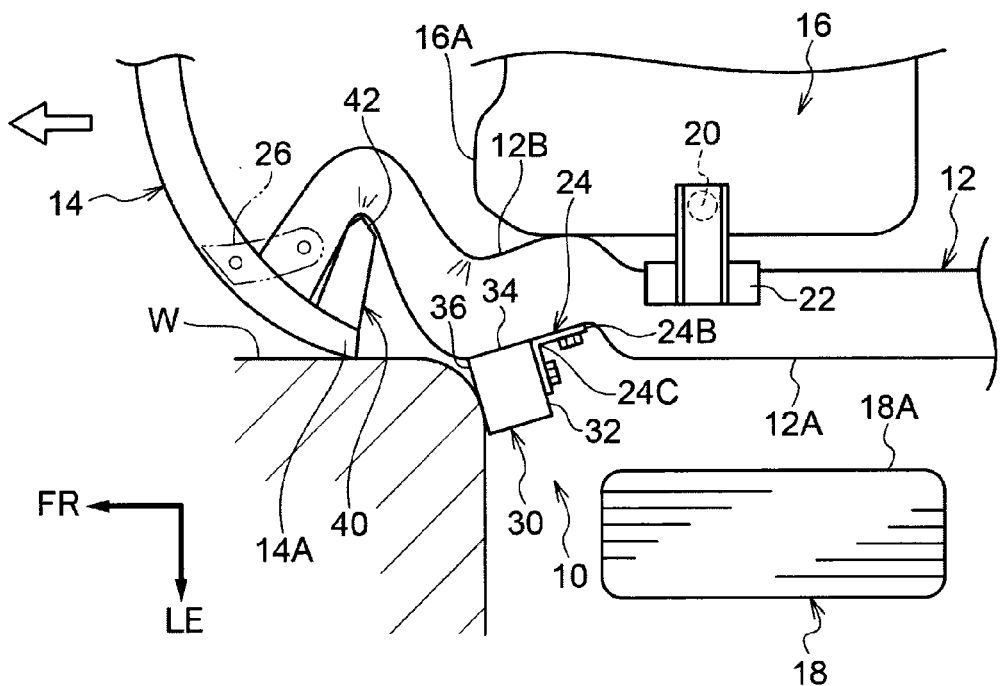
FIG. 23B is a plan view illustrating a state after a small overlap collision in which a first projection member of a vehicle body front section structure according to the ninth exemplary embodiment has been turned by a barrier.

As illustrated in FIG. 23B, sometimes the barrier W turns the first projection member 30 relatively toward the vehicle body rear inner side about the vicinity of the bent portion 24C of the coupling bracket 24 accompanying forward motion of the vehicle, and a portion of the front side member 12 close to the bracket 22 is pushed toward the vehicle width direction inner side by the other end portion 24B of the coupling bracket 24.

In such cases, the portion of the front side member 12 close to the bracket 22 is accordingly bent further toward the vehicle width direction inner side, and the inside wall 12B impinges on the power unit 16. This thereby enables the collision load input to the first projection member 30 to be efficiently transmitted to the power unit 16 through the front side member 12, enabling efficient generation of lateral force with respect to the vehicle.

Tenth Exemplary Embodiment

Lastly, explanation follows regarding a tenth exemplary embodiment. Note that elements equivalent to those of the first exemplary embodiment described above are allocated the same reference numerals, and detailed explanation thereof (including of common operation) is omitted as appropriate.

Figure 24:
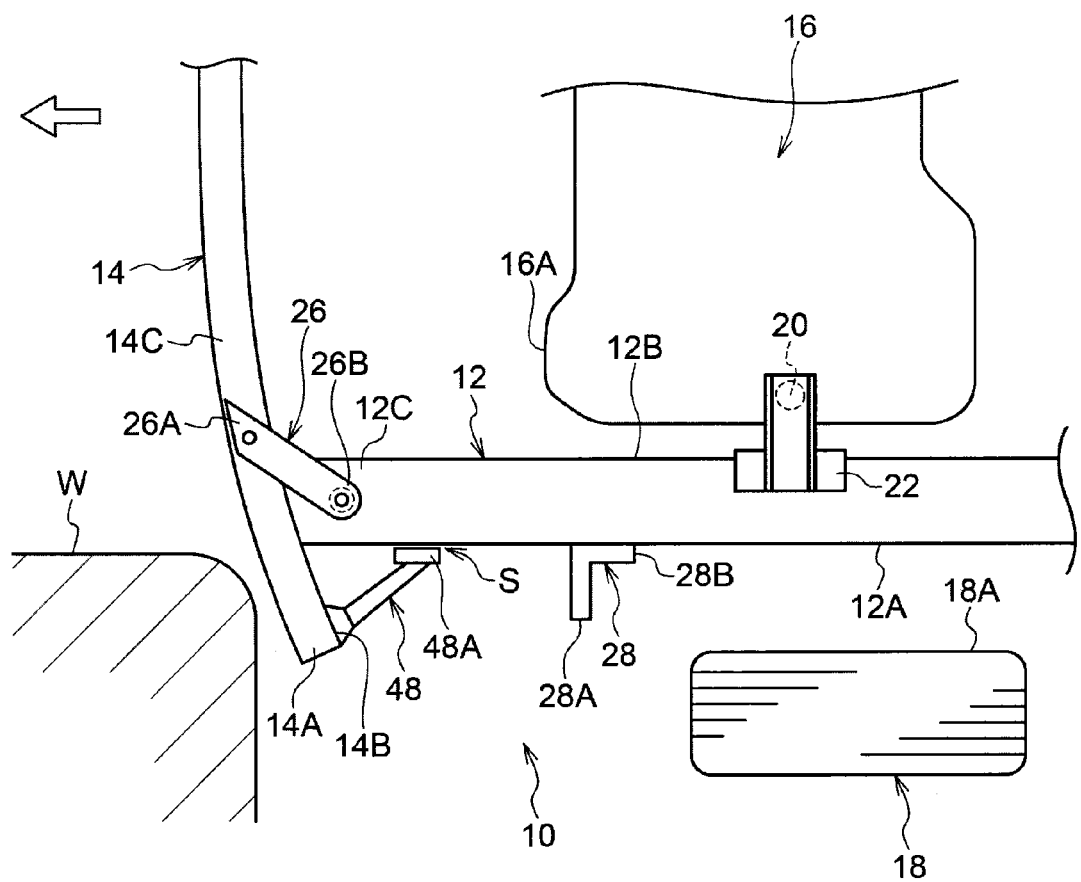
FIG. 24 is a plan view illustrating a state prior to a small overlap collision in a vehicle body front section structure according to a tenth exemplary embodiment.
Figure 25:
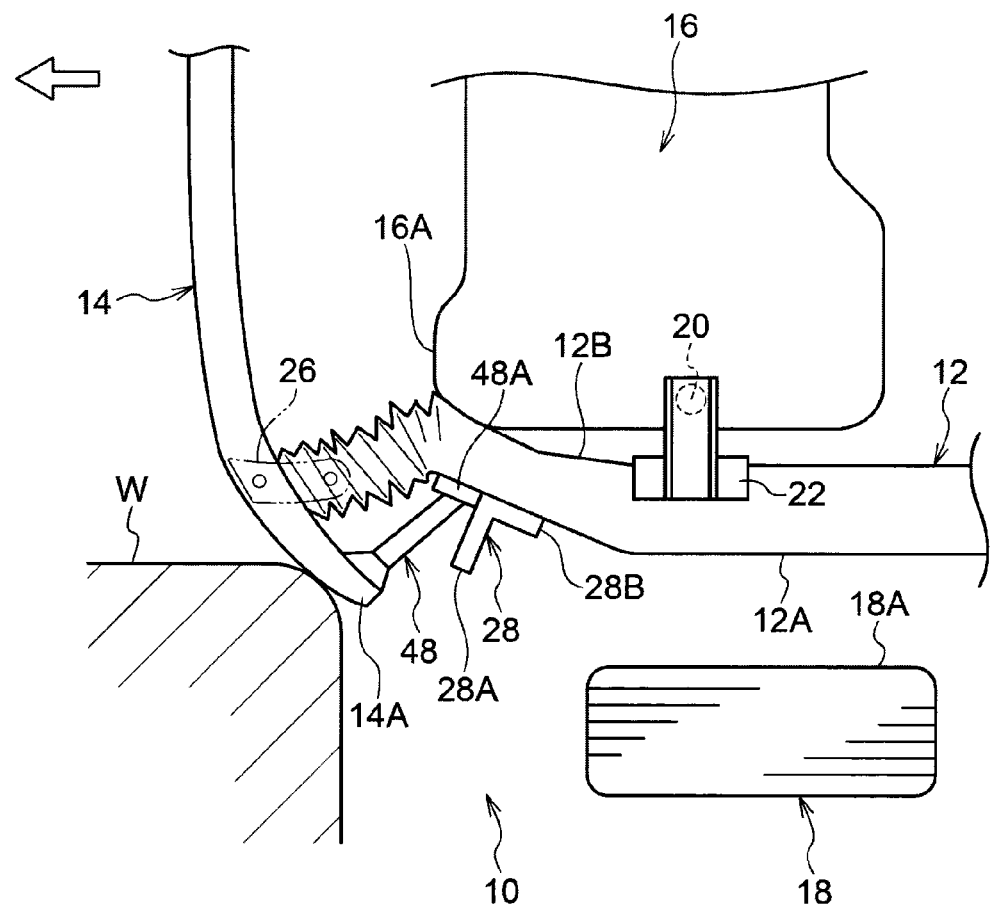
FIG. 25 is a plan view illustrating a state after a small overlap collision in which a front side member has undergone crushing deformation and bending deformation in a vehicle body front section structure according to the tenth exemplary embodiment.

As illustrated in FIG. 24, in the tenth exemplary embodiment, the outside wall 12A of the front side member 12 is provided with a stopper member 28 serving as a first projection member. A slider member 48 serving as a second projection member is provided at the rear wall 14B at the side of the end 14A of the front bumper reinforcement 14.

The stopper member 28 is formed from flat plate shaped metal, bent substantially into an L-shape in plan view. One end portion (a load bearing face) 28A of the stopper member 28 is disposed facing the slider member 48 across a specific gap in the vehicle body front-rear direction. Another end portion (a load transmission face) 28B of the stopper member 28 is fastened and fixed to a specific position on the outside wall 12A by a bolt (not illustrated in the drawings) and a weld nut (not illustrated in the drawings), so as to be positioned further to the vehicle body rear side than at least the vehicle body front side end 16A of the power unit 16.

Similarly to the second projection member 40 of the ninth exemplary embodiment, the slider member 48 extends from the rear wall 14B at the side of the end 14A of the front bumper reinforcement 14, toward the vehicle body rear inner side (at an angle with respect to the vehicle body front-rear direction and the vehicle width direction). A rear end of the slider member 48 is integrally provided with a flat plate portion 48A including an opposing face that faces the outside wall 12A across a space S.

In the event of a small overlap collision, the slider member 48 slides relatively toward the vehicle body rear along the outside wall 12A, until a rear end of the flat plate portion 48A impinges on (abuts) the one end portion 28A of the stopper member 28. Namely, the relative movement of the slider member 48 toward the rear is limited by the stopper member 28, such that the behavior of the slider member 48 is stably controlled by the stopper member 28.

Accordingly, in the event of a small overlap collision in which the left side of the vehicle collides with the barrier W, the slider member 48 slides along the outside wall 12A toward the vehicle body rear while the front end side of the front side member 12 undergoes crushing deformation (axial direction crushing), and the rear end of the flat plate portion 48A of the slider member 48 abuts the stopper member 28, thereby limiting the movement toward the rear.

The slider member 48 that has been restricted from moving toward the rear then causes a portion of the front side member 12 to undergo bending deformation toward the vehicle width direction inner side, and the inside wall 12B impinges on the power unit 16. This thereby enables a portion of the collision load input in the small overlap collision to be efficiently transmitted from the slider member 48, through the front side member 12 and the engine mount 20, and into the power unit 16, enabling efficient generation of lateral force with respect to the vehicle.

Note that in the event of a small overlap collision in which the left side end 14A of the front bumper reinforcement 14 collides with the barrier W, the left side end 14A and the slider member 48 do not impinge on (abut) the front wheel 18 even when the left side end 14A turns toward the vehicle body rear side about the vicinity of the right side end portion (not illustrated in the drawings) of the front bumper reinforcement 14.

Explanation has been given regarding the vehicle body front section structure 10 according to the exemplary embodiments with reference to the drawings; however the vehicle body front section structure 10 according to the exemplary embodiments is not limited by the illustrations, and various design modifications are possible within a range not departing from the spirit of the present invention. For example, in cases in which the first projection member 30 is made out of resin, the first projection member 30 may be attached to the outside wall 12A of the front side member 12 through a retainer, not illustrated in the drawings.

The first projection member 30 (including the stopper member 28) and the second projection member 40 (including the slider member 48) are disposed at the vehicle width direction inner side of the inner face 18A of the front wheel 18 in plan view; however there is no limitation thereto. There is, moreover, no particular limitation to the relationship between the length of the first projection member 30 in the vehicle width direction and the length of the second projection member 40 in the vehicle width direction.

The brace 26 is provided spanning between the front side member 12 and the front bumper reinforcement 14, extending at an angle with respect to the vehicle body front-rear direction and the vehicle width direction; however there is no limitation thereto. The rear wall (rear end portion) 32 of the first projection member 30 need not be positioned further to the vehicle body rear side than the vehicle body front side end 16A of the power unit 16 in plan view as long as the configuration enables load to be transmitted to the power unit 16. Moreover, explanation has been given in which the vehicle body front section structure 10 according to the exemplary embodiments is configured with left-right symmetry, however it may configured without left-right symmetry.

The entire contents of the disclosure of Japanese Patent Application No. 2012-268756 are incorporated by reference in the present specification. All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A vehicle body front section structure comprising:
    a front side member that is disposed along a vehicle body front-rear direction at a vehicle width direction outer side of a vehicle body front section;
    a front bumper reinforcement that is disposed extending in a vehicle width direction at a vehicle body front side of the front side member;
    a first projection member that is provided at an outside wall of the front side member, and that projects out further to the vehicle width direction outer side than the outside wall of the front side member, a rear end portion of the first projection member being positioned further to a vehicle body rear side than a vehicle body front side end of a power unit installed to a vehicle width direction inner side of the front side member in plan view;
    a second projection member that is provided at a vehicle width direction end side of the front bumper reinforcement, and that overlaps with the first projection member as viewed from the front, the second projection member being either provided with a gap between the second projection member and the outside wall of the front side member, or provided detaching from the outside wall of the front side member when collision load has been input to the front side member; and
    a coupling bracket that is provided at the vehicle body rear side of the first projection member, and that couples together the front side member and the first projection member,
    wherein the first projection member is separate from the second projection member in the vehicle body front-rear direction,
    wherein the coupling bracket is fastened and fixed to a rear wall of the first projection member in the vehicle body front-rear direction, and is fastened and fixed to the outside wall of the front side member in a vehicle width direction, and wherein an inner wall of the first projection member is fastened to the outside wall of the front side member.

2. The vehicle body front section structure of claim 1, further comprising a coupling member that couples the front side member to the front bumper reinforcement at an angle with respect to the vehicle body front-rear direction and the vehicle width direction.

3. The vehicle body front section structure of claim 1, wherein the first projection member and the second projection member are disposed further to the vehicle width direction inner side than a front wheel in plan view.

4. The vehicle body front section structure of claim 1, wherein the first projection member is provided further to the vehicle body front side than an engine mount in plan view.

5. The vehicle body front section structure of claim 1, wherein at least one of the first projection member and the second projection member includes an angled face.

6. The vehicle body front section structure of claim 1, wherein one of a front face of the first projection member and a rear face of the second projection member includes a raised portion, and the other of the front face of the first projection member and the rear face of the second projection member includes a recess having a shape complementary to that of the raised portion.

* * * * *